United States Patent
Ellis et al.

(10) Patent No.: US 9,189,766 B2
(45) Date of Patent: Nov. 17, 2015

(54) REAL TIME PROVISIONAL EVALUATION OF UTILITY PROGRAM PERFORMANCE

(71) Applicant: EnergySavvy Inc., Seattle, WA (US)

(72) Inventors: Charles David Ellis, Seattle, WA (US); Leonid Borisovich Shklovskii, Seattle, WA (US); Mark Louis Ghazal, Seattle, WA (US); Brett Clouser, Seattle, WA (US); Aaron Ross Goldfeder, Seattle, WA (US)

(73) Assignee: EnergySavvy Inc., Seattle, WA (US)

( * ) Notice: Subject to any disclaimer, the term of this patent is extended or adjusted under 35 U.S.C. 154(b) by 0 days.

(21) Appl. No.: 14/106,363

(22) Filed: Dec. 13, 2013

(65) Prior Publication Data

US 2015/0073874 A1    Mar. 12, 2015

Related U.S. Application Data

(60) Provisional application No. 61/876,083, filed on Sep. 10, 2013.

(51) Int. Cl.
*G06F 19/24* (2011.01)
*G06Q 10/06* (2012.01)
*G06N 5/00* (2006.01)

(52) U.S. Cl.
CPC ............ *G06Q 10/06393* (2013.01); *G06N 5/00* (2013.01)

(58) Field of Classification Search
CPC .................................. G06Q 50/06; H02J 3/14
USPC .......................................................... 706/12
See application file for complete search history.

(56) References Cited

U.S. PATENT DOCUMENTS

2012/0150707 A1* 6/2012 Campbell et al. ............... 705/34

OTHER PUBLICATIONS

Abels, B. et al., "Understanding Industrial Energy Use Through Lean Energy Analysis." SAE International Journal of Materials and Manufacturing, 2011 (13 pages).
Granderson, J. et al., "Evaluation of the Predictive Accuracy of Five Whole-Building Baseline Models." Environmental Energy Technologies Division, Ernest Orlando Lawrence Berkeley National Laboratory, LBNL-5886E, Aug. 2012 (28 pages).

(Continued)

*Primary Examiner* — Kakali Chaki
*Assistant Examiner* — Michael Zidanic
(74) *Attorney, Agent, or Firm* — John W. Branch; Lowe Graham Jones PLLC

(57) ABSTRACT

Embodiments are directed towards automatic provisional evaluation of utility program performance. Treatment facilities may be determined depending characteristics of a project. A performance profile corresponding to each treatment facility may be generated based on historical information corresponding to each treatment facility. Current usage information and current weather information for each treatment facility may be determined. Pre-treatment usage information that corresponds to each treatment facility may be determined based on the performance profile and the current usage information and the current weather information. A program evaluation report may be generated that includes program realization information. Program realization information may be based on an aggregation of project savings information that corresponds to the treatment facilities. Project savings information may be modified based on confidence weights. A program evaluation report may include information from one or more comparison facilities.

30 Claims, 12 Drawing Sheets

(56) References Cited

OTHER PUBLICATIONS

Measurement and Verification Using Billing Analysis and Regression Models. CenterPoin Energy Program Manual v4.0, 2004, pp. 8-1-8-4.

Rachlin, J. et al., "The Stability of Prism Estimates." Energy and Buildings, 9, 1986, pp. 149-157.

Sonderegger, R C. "A Baseiine Model for Utility Bill Analysis Using Both Weather and Non-Weather-Related Variables," Conference: 1998 ASHRAE summer annual meeting, Toronto (Canada), Jun. 20, 1998, 18 pages.

Todd A. et al., "Evaluation, Measurement and Verification (EM&V) for Behavior-Based Energy Efficiency Programs: Issues and Recommendations." ACEEE Summer Study on Energy Efficiency in Buildings, 2012, pp. 2-306-2-321.

Jackson, J., "Improving Energy Efficiency and Smart Grid Program Analysis with Agent-Based End-Use Forecasting Models." Energy Policy. 38.7, 2010, pp. 3771-3780.

ASHRAE Guideline, Measurement of Energy and Demand Savings. ASHRAE Guideline 14-2002, American Society of Heating, Refrigerating and Air-Conditioning Engineers, Inc., Atlanta, 2002 (170 pages).

Regression for M&V: Reference Guide. Bonneville Power Administration, Version 1.0, DOE\BP-4353, Sep. 2011 (56 pages).

Mathieu, J. et al., "Quantifying Changes in Building Electricity Use, with Application to Demand Response." IEEE Transactions on Smart Grid, Apr. 2011 (23 pages).

Sergici, S. et al., "Measurment and Verification Principles or Behavior-Based Effciency Programs." The Brattle Group, Inc., May 2011 (22 pages).

* cited by examiner

REAL TIME PROVISIONAL EVALUATION OF UTILITY PROGRAM PERFORMANCE

CROSS-REFERENCE TO RELATED APPLICATION(S)

This application is a Utility Patent application based on a previously filed U.S. Provisional Patent application, U.S. Ser. No. 61/876,083 filed on Sep. 10, 2013, the benefit of the filing date of which is hereby claimed under 35 U.S.C. §119(e) and incorporated herein by reference.

TECHNICAL FIELD

The present invention relates generally to performance evaluation of utility programs, and more particularly, but not exclusively to impact evaluation of efficiency programs.

BACKGROUND

Utilities, such as, electrical utilities, water utilities, or the like, are often required to implement efficiency programs, such as energy efficiency programs that may be designed to reduce the energy consumption or peak demand of their consumers. Often the utilities are required to commit to specified efficiency (e.g., energy reduction) targets. In some cases, utilities that fail to meet these reduction targets may be subject to sanctions and/or fines imposed by one or more regulatory agencies.

Efficiency programs, such as energy efficiency programs may take many forms and may involve multiple projects. Some of these projects may include retrofitting existing facilities to reduce demand for and/or consumption of services, such as electricity, water, natural gas, or the like. Projects may be directed to some or all of the various types of facilities that receive services from the utility, such as, single family housing, multi-family housing, commercial buildings, manufacturing facilities, or the like. Efficiency programs may be required to undergo an evaluation to determine if they met the efficiency targets that were promised or expected by the utility or required by the body regulating the utility. If the programs fail to meet the promised or expected reduction targets, the utility may be subject to additional regulatory scrutiny or potentially even fines or other sanctions.

Given current approaches, it may be difficult for utilities to evaluate programs while the programs are being implemented. Thus, utilities usually wait until a program is completed before determining if the program's targets have been met. Accordingly, it may be difficult for utilities to determine whether their programs need to be modified to meet their targets during the implementation, or how they might improve the performance of programs at meeting the relevant targets. Thus, utilities may be liable for severe fees and sanctions if the programs fall short, or they may over-engineer the program/projects to mitigate the risk of falling short of their targets. Thus, it is with respect to these considerations and others that the invention has been made.

BRIEF DESCRIPTION OF THE DRAWINGS

Non-limiting and non-exhaustive embodiments of the present innovations are described with reference to the following drawings. In the drawings, like reference numerals refer to like parts throughout the various figures unless otherwise specified. For a better understanding of the present innovations, reference will be made to the following Description of the Various Embodiments, which is to be read in association with the accompanying drawings, wherein.

DESCRIPTION OF VARIOUS EMBODIMENTS

Figure 1:
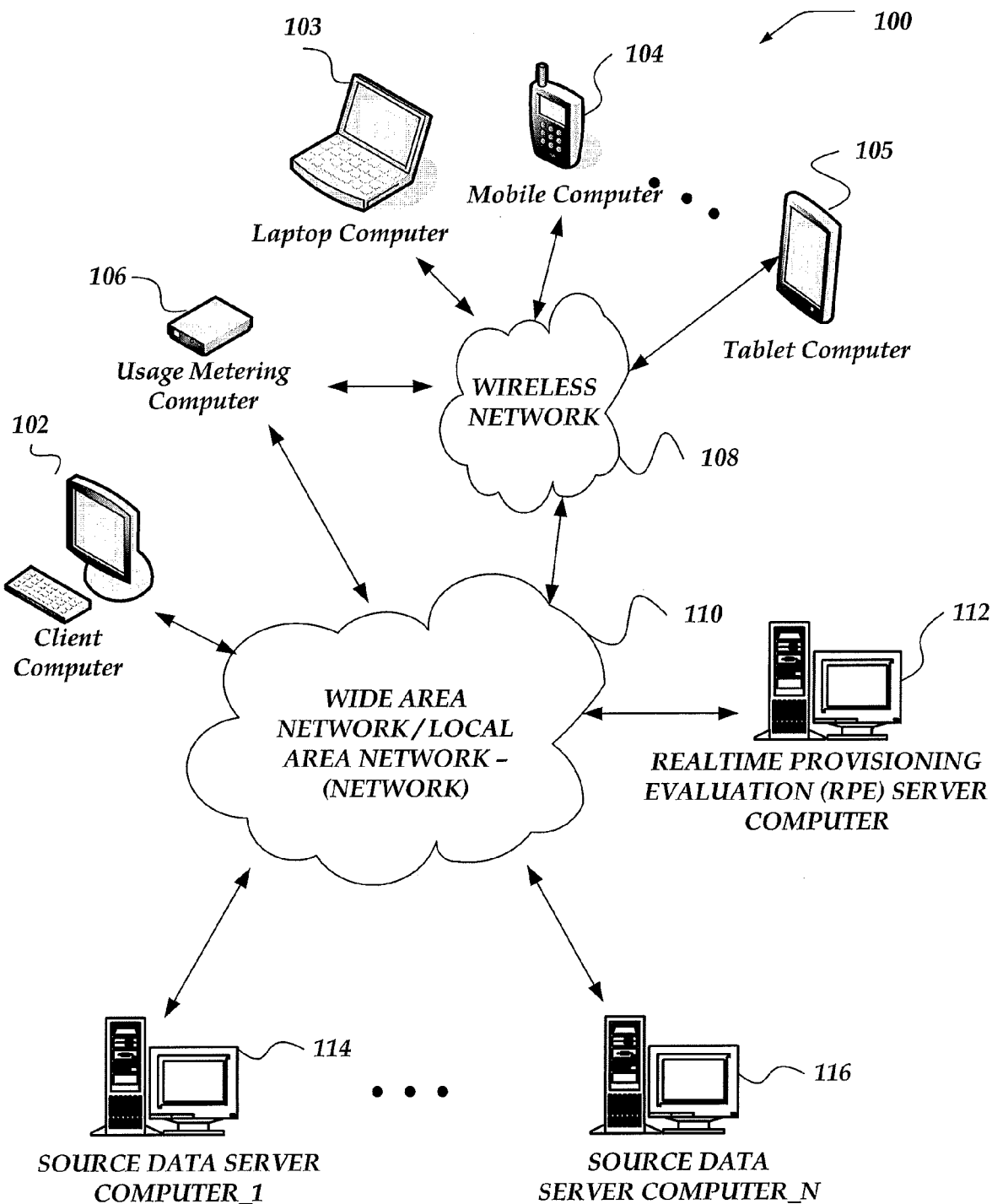
FIG. 1 illustrates a system diagram showing components of an environment in which at least one of the various embodiments may be practiced.

The present innovations now will be described more fully hereinafter with reference to the accompanying drawings, which form a part hereof, and which show, by way of illustration, specific embodiments by which the invention may be practiced. These innovations may, however, be embodied in many different forms and should not be construed as limited to the embodiments set forth herein; rather, these embodiments are provided so that this disclosure will be thorough and complete, and will fully convey the scope of the invention to those skilled in the art. Among other things, the present innovations may be embodied as methods, computers, or devices. Accordingly, the present innovations may take the form of an entirely hardware embodiment, an entirely software embodiment or an embodiment combining software and hardware aspects. The following detailed description is, therefore, not to be taken in a limiting sense.

Throughout the specification and claims, the following terms take the meanings explicitly associated herein, unless the context clearly dictates otherwise. The phrase "In one of the embodiments" or "in at least one of the various embodiments" as used herein does not necessarily refer to the same embodiment, though it may. Furthermore, the phrase "in another embodiment" as used herein does not necessarily refer to a different embodiment, although it may. Thus, as described below, various embodiments of the innovations may be readily combined, without departing from the scope or spirit of the innovations.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," "the" include plural references. The meaning of "in" includes "in" and "on."

As used herein, the term "utility" refers to entities that are involved in one or more of generation, transmission, sales, or delivery of utility services, such as, electric power, natural gas, water, sewage, waste management, recycling, or the like. Utilities may often be quasi-public corporations, operating under a grant or license from a local or regional government these may be referred to as public utilities. Utilities are usually organized based on the type of energy they provide, such as, electricity, natural gas, or the like. In some cases, they are organized and/or described based on the type of power plants they use to generate energy, such as, coal, nuclear, steam, hydro-power, or the like. In the interest of clarity, the embodiments disclosed herein may be described in terms of electric power utilities. However, the innovations are not so limited. Thus, utilities providing services other than electrical power are contemplated as being within the scope of the innovations described and claimed herein.

As used herein, the terms "service," and "services" refers to the services provided by a utility. For example, the service provided by energy utilities may be power, such as, electricity, natural gas, steam, or the like. Likewise, the service provided by water utilities is water, and so on, for other types of utilities.

As used herein, the term "facility" refers to commercial or residential buildings or structures that are receiving services from a utility. There may be several type of facilities, including residential (including single-family housing and multi-family housing), commercial, retail, industrial, agricultural, public (such as federal, state, or municipal), or the like. A facility may be considered to be a component of a larger structure and/or facility. For example, in some cases, a factory may have several large energy consuming machines that are metered individually. In this type of case, each machine may be considered a facility. Generally, if the utility services demanded by a component may be metered that component may be considered a facility for the purposes of utility performance purposes. A treatment facility is a facility that is or will undergo treatment as part of project. A comparison facility is a facility that is assigned to a comparison group.

As used herein, the terms "program," "conservation program," or "efficiency program", refer to intentional efforts by a utility to reduce the demand from its subscribers/consumers for provided services, such as energy. A program may include a set of one or more projects and/or treatments designed to reduce service consumption. Programs may have a specified duration and a specified set of service demand reduction targets. Programs may be evaluated to determine if they are meeting, or have met, their service demand reduction targets. For example, in at least one of the various embodiments, an electric power utility may implement a two-year program to reduce energy consumption through the retrofitting of existing homes with additional insulation with a 1 gigawatt hour demand reduction target. Examples of classes of service demand reduction targets include reducing the total quantity of a resource or service used (e.g. energy, water, or waste removal), reducing the demand for the service at peak service utilization or at other periods of service or resource scarcity, or reducing the total quantity or service demand in a particular geographic location or among a certain type of service or customers.

As used herein, the term "project" refers to actions by a utility to enable its subscribers, consumers, and/or user base to reduce their consumption of services at a single facility, using a collection of specific treatments. Accordingly, for energy utilities, a project may be designed to reduce the energy demand of a subscriber who may be the owner or operator of a facility. Projects may include improving the service efficiency of a new or existing facility that is serviced by the utility. Improving efficiency of an existing facility may include retrofitting the facility to reduce service demand. For example, for energy utilities, a project may be designed to retrofit a building to improve the energy efficiency of a facility within the building. Examples of energy efficiency projects may include adding insulation, replacing insulation, roof repair/replacement, replacing outdated appliances with newer energy efficient appliances, replacing single pane windows with multi-pane windows, installing set back thermostat controls, enrolling consumers into smart-grid programs, replacing inefficient water heaters, replacing inefficient furnaces, replacing inefficient air conditioners, light bulb replacement or the like, or combinations thereof. Also, some projects may be educational/behavioral in nature, such as, providing classes on how to reduce service consumption, peak/off-peak pricing, public awareness campaigns, public service commercials, or the like, or combination thereof. In at least one of the various embodiments, project performance may be tracked separately for each facility that is treated as part of a project. For example, a program may include providing tax credits to subscribers that replace their facility's roofs using energy saving materials. In this case, each facility that has a roof replaced under the program may be considered to be a separate project.

As used herein, the term "weather data source" refers to various sources of weather information that may be available to a utility. Weather data may include real-time information, historical information, forecast information, or the like. Weather data may be segmented and/or aggregated based on one or more political or geographical regions, such as, countries, portions of countries (e.g., Eastern, Western, Southern, Northern, Central, or the like), states, portion of states, postal codes, cities, neighborhoods, or the like. Weather data may be provided by one or more international or domestic public or private agencies, such as, the United States National Weather Service (NWS), National Oceanic and Atmospheric Administration (NOAA), Environment Canada's Meteorological Service of Canada, regional agencies, state agencies, or the like. Further, weather data may be collected and/or generated by the utility itself using various weather data collection instruments. Weather data may include raw and/or normalized data. Also, weather data may include values computed in terms of heating degree days, cooling degree days, or the like.

As used herein, the term "heating degree day (HDD)" refers to a well-known measurement of weather that may be used to model demand for services relating to the heating of a facility that are less efficient, and thus consume more services, below a certain temperature point. The number of HDD for a given location and a given period is defined to be the length of the period in days times the total number of degrees below a given base temperature each day that occur at the given location during the given period. The heating demand for a given facility at a specific location may be modeled as being proportional to the number of HDD at that location. HDDs are defined relative to a base temperature that represents the outside temperature above which a facility has no demand for heating services. The appropriate base temperature for facilities within a particular building depend on the target temperature to which the building is heated and the ability of the building to maintain temperature irrespective of external temperature. Accordingly, the more HDDs a facility is exposed to, the higher the usage demand for heating.

As used herein, the "cooling degree day (CDD)" refers to a well-known measurement of weather that may used to model demand for services relating to the cooling of a facility or that are less efficient, and thus consume more services, above a certain temperature. CDD is similar to HDD except it is a measurement of the degree days of cooling required to lower the temperature to a base temperature.

As used herein, the term "usage data source" refers to a source or sources of information regarding the demand for service (i.e. the usage or services) at facilities serviced by a utility (e.g., utility service demand information). For energy utilities, usage data typically consists of the amount of energy used and power demanded by the facility over various periods of time. Usage data may be provided for various lengths of time periods, such as, monthly, weekly, daily, hourly or the like, depending the availability and precision of service metering devices. In some embodiments, the utility's own metering infrastructure and data systems, including the systems that are used for customer billing, may be the primary usage data source. In other embodiments, the usage data may come from a meter or other source of usage information maintained by the operator of the facility or a third party.

As used herein, the term "operations data source" refers to sources of information about the operational requirements of one or more facilities that may be relevant to the service demands of the facility or facilities. This may include operational/manufacturing data from commercial facilities, and may be obtained from a supervisory control and data acquisition (SCADA) system or similar. Such information may include information that may be associated with the service demands, such as energy usage of the facility, because service demands may increase when the operation of the building requires additional hours or intensity of operation. For example, an automobile factory facility may provide information that includes the number of automobiles produced over a time period. This type of information may be useful for evaluating utility efficiency projects over the same time period. For example, a change in energy demand may be caused by the change in manufacturing activity rather than being influenced by the efficiency of the energy use in the facility.

As used herein, the term "project data source" refers to sources of information about the goals, target, progress, completion, or the like, of each project that make up one or more utility efficiency programs. Project data sources may include one or more databases that include information regarding various aspects of one or more of projects. This may include, facility information (e.g., asset information, geographic information, occupancy information, or the like), project updates, retrofit/installation updates (e.g., appliances replaced, insulation improvement, windows replaced, or the like), target/expected efficiency savings information, or the like. In at least one of the various embodiments, project information may be collected using one or more project tracking applications that may enable those administering the program or implementing the project to provide project status information as actions related to projects are completed on a facility.

As used herein, the term "asset information" refers to information regarding the systems, including structural systems, HVAC systems, water systems, energy systems, waste systems, etc., or installation information for systems, that impact the service demands of a facility or facilities, and which may be added, altered, or otherwise improved upon as a part of a project and/or program. Asset information may include details that may be employed to compute one or more service demand or efficiency values for a particular facility. Such information may include construction materials, foundation type, heating and cooling plant information, number and types of pump employed, and operational settings of each system, or the like.

As used herein, the term "treatment group" refers to the collection of facilities that have participated in a project during a given program implementation period.

As used herein, the term "comparison group" refers to the collection of facilities to which the treatment group is compared in order to more accurately ascertain the impact of participation in the program, and consists of facilities which have not participated in the program during the implementation period. The comparison group can provide a more effective comparison for the treatment group facilities (and hence a more accurate picture of the effect of program participation) if the comparison group members have been selected so as to have similar characteristics and make up as the facilities that make up the treatment group. For example, if a treatment facility for a project is a three bedroom home occupied by a family of four built before 1970 and with single-pane windows, it is typically most effective to include facilities having similar characteristics in the comparison group.

As used herein, the terms "profile," "performance profile," and "pre-treatment performance profile" each refer to the model of the relationship between the weather and operational data at a facility and the service demands of that facility. Profiles may be comprised of one or more models that represent a particular facility. In at least one of the various embodiments, profiles may be generated based on generating curves fitted to historical service usage information and historical weather and operational information for a given facility. Pre-treatment performance profiles may be generated to model facility responsiveness based on how the facility is expected to perform before a treatment associated with a project has been performed.

As used herein, the terms "observed savings" or "observable savings" refer to a measurement of the amount post-treatment service reduction observed at a treatment facility over a time period. Observed savings may be expressed in units appropriate for the utility service that is being measured, such as kilowatt hours (KWh) for energy services, gallons for water services, etc.

As used herein, the term "typical year savings" refers to the savings which obtain for a project during an idealized year that includes typical weather and operational patterns. Typical year savings may be used to measure utility service demand reduction programs in order to avoid weather or operational dependence in utility program evaluation. Typical year savings may be calculated as occurring in an idealized year with typical weather and typical operational use over the course of a year.

As used herein, the terms "savings confidence" or "confidence rate" refer to a measurement of the amount of a typical year's worth of utility service demand reduction that should be observable during the post-treatment period for a given project at a given facility given the time period for which data is available. A savings confidence of 100% or greater, therefore, may be obtained for some or all projects for which at least a full typical year of service demand reduction should be observable. Note that savings confidence refers to how much of the savings should be observable, as opposed to how much savings are observed. Hence, in at least one of the various embodiments, a savings confidence of 25% for a project corresponds with only having data for a period of time during which a quarter of a typical year's savings observable, as opposed to corresponding to a period during which the observed savings were 25% of what was expected during a typical year.

As used herein, the term "annualized savings" refers to a measurement of the amount of post-treatment reduction in service at a treatment facility that would be seen over a typical year. Annualized savings may differ from observed savings in that observed savings occur in specific weather and operational patterns, and over a specified period, which is not necessarily a year, whereas annualized savings occur are adjusted to represent a full year with typical weather and operational use patterns. Annualized savings may be used in reporting savings to customers, including, facility owners, facility occupants, facility managers, facility operators, or the like, or for regulatory purposes where utilities should not be penalized or benefit from weather or operational patterns over which they have no control. Annualized savings may be expressed in the same units as observed savings.

As used herein, the term "expected savings" refers to a measurement of the amount of post-treatment reduction in service at a treatment facility that is expected over the course of a typical year. Expected savings are typically calculated as a part of performing and inspecting a treatment, and they assume typical weather and operations over the course of a year. Expected savings may be expressed in the same units as observed savings.

As used herein, the term, "comparison savings" refers to a measurement of the amount service reduction observed at a comparison facility over time period. In some cases, comparison savings may be used to determine if there may be performance profile bias for a particular facility and/or project. Comparison savings may be expressed in units appropriate for the utility service that is being measured, such as, kilowatt hours (kWh) for energy services.

As used herein, the term "realization rate" refers to the ratio of the actual project or program savings (e.g., the actual utility service demand reduction) to the expected and/or predicted project or program savings (e.g., utility service demand reduction). The realization rate may be determined for a project or for a program. When determining the realization rate of a program, the determination may be made based on some or all of the projects in a utility program.

Briefly stated, various embodiments are directed towards real time provisional evaluation of utility program performance in terms of actual reduction in utility service demand as is or would be observable by utility service metering. In at least one of the various embodiments, actual utility service demand reduction is determined by observing the ratio of the actual savings to the expected savings for projects whose savings are observable, then using that ratio to calculate the likely actual savings for all projects in a program, regardless of the observability of their savings.

In at least one of the various embodiments, observable project savings may be determined by comparing a prediction of usage based on the pre-treatment relationship between weather, operations, and usage to the actual usage in the post-treatment period. In at least one of the various embodiments, pre-treatment utility service demand information (e.g. pre-treatment energy usage, in the case of an energy utility), pre-treatment operational data, and pre-treatment weather information may be used to create a performance profile that can be used to predict utility service demand based on weather and operations. In at least one of the various embodiments, the historical information used to generate the performance profile may be based on at least a portion of historical usage information and at least a portion of the historical weather information and the historical operational information that corresponds to each respective treatment facility. In at least one of the various embodiments, the predicted usage in the post-treatment period is calculated by combining the performance profile with the current weather and operational information to predict service demand in the post-treatment period. In at least one of the various embodiments, the observable savings during the post-treatment period can then be determined by comparing the predicted usage to the actual usage.

In at least one of the various embodiments, expected savings may be aggregated using the savings confidence as a weighting so as to factor projects whose service demand reduction should be more observable more heavily than projects which are not as observable. In at least one of the various embodiments, the savings confidence may be calculated for each project with observable savings information by comparing observable weather and operational use to the weather and operational use in a typical year. In at least one of the various embodiments, the confidence may be multiplied by the expected annual savings, and the weighted values are added when obtaining the expected program savings. The observable savings, which may be normally aggregated (added), may then be compared to this weighted value which reflects the portion of the typical year that has been observed.

In at least one of the various embodiments, project savings information for a reduction in utility service demand for each treatment facility may be generated such that the project savings information may be based on at least completion of at least one project for a treatment facility and includes a comparison of the reduced utility service demand for the treatment facility to utility service demand for at least one comparison facility. In at least one of the various embodiments, the project savings information may be generated based on a comparison of the at least pre-treatment usage information and the at least portion of current usage information. In at least one of the various embodiments, the project savings information may be modified to account for the comparison savings value. Also, in at least one of the various embodiments, the project savings information may be modified based on a comparison savings value that has been adjusted by a comparison weighting value.

In at least one of the various embodiments, a program evaluation report that may be based on execution of at least a portion of the projects for at least a portion of the treatment facilities may be generated, wherein the program evaluation report may include at least program realization information that may be based on at least an aggregation of project savings information that may be generated for each treatment facility treated by each project.

Also, in at least one of the various embodiments, generating a program evaluation report may include using one or more comparison facilities. Accordingly, in at least one of the various embodiments, another performance profile may be generated for each comparison facility. Also, in at least one of the various embodiments, comparison savings information may be generated based on the other performance profile and the at least portion of current weather information. In at least one of the various embodiments, the project savings information may be modified to account for the comparison savings value.

In at least one of the various embodiments, one or more comparison facilities corresponding to the treatment facility may be determined based on one or more characteristics of the treatment facility. In at least one of the various embodiments, realization rate information, including a realization rate, may be generated based on at least expected program savings information and observed or net program savings information. Also, in at least one of the various embodiments, at least a portion of project information may be updated based on a program recommendation, wherein the program recommendation may be based on at least the historical information and the at least current usage information.

Illustrative Operating Environment

FIG. 1 shows components of one embodiment of an environment in which embodiments of the invention may be practiced. Not all of the components may be required to practice the invention, and variations in the arrangement and type of the components may be made without departing from the spirit or scope of the invention. As shown, system 100 of FIG. 1 includes local area networks (LANs)/wide area networks (WANs)—(network) 110, wireless network 108, client computers 102-106, Real-time Provisioning Evaluation (RPE) Server Computer 112, and Source Data Server Computers 114-116.

At least one embodiment of client computers 102-106 is described in more detail below in conjunction with FIG. 2. In one embodiment, at least some of client computers 102-106 may operate over a wired and/or wireless network, such as networks 110 and/or 108. Generally, client computers 102-106 may include virtually any computing computer capable of communicating over a network to send and receive information, perform various online activities, offline actions, or the like. In one embodiment, one or more of client computers 102-106 may be configured to operate within a business or other entity to perform a variety of services for the business or other entity. For example, client computers 102-106 may be configured to operate as a web server, an accounting server, a billing server, a usage metering server, or the like. However, client computers 102-106 are not constrained to these services and may also be employed, for example, as an end-user computing node, in other embodiments. It should be recognized that more or less client computers may be included within a system such as described herein, and embodiments are therefore not constrained by the number or type of client computers employed.

Computers that may operate as client computer 102 may include computers that typically connect using a wired or wireless communications medium such as personal computers, multiprocessor systems, microprocessor-based or programmable electronic devices, network PCs, or the like. In some embodiments, client computers 102-106 may include virtually any portable computer capable of connecting to another computer and receiving information such as, laptop computer 103, smart mobile telephone 104, tablet computers 105, usage metering computer 106, or the like. However, portable computers are not so limited and may also include other portable computers such as cellular telephones, display pagers, radio frequency (RF) devices, infrared (IR) devices, Personal Digital Assistants (PDAs), handheld computers, wearable computers, integrated devices combining one or more of the preceding computers, or the like. As such, client computers 102-106 typically range widely in terms of capabilities and features. Moreover, client computers 102-106 may access various computing applications, including a browser, or other web-based application.

A web-enabled client computer may include a browser application that is configured to receive and to send web pages, web-based messages, and the like. The browser application may be configured to receive and display graphics, text, multimedia, and the like, employing virtually any web-based language, including a wireless application protocol messages (WAP), and the like. In one embodiment, the browser application is enabled to employ Handheld Device Markup Language (HDML), Wireless Markup Language (WML), WMLScript, JavaScript, Standard Generalized Markup Language (SGML), HyperText Markup Language (HTML), eXtensible Markup Language (XML), JavaScript Object Notation (JSON), or the like, to display and send a message. In one embodiment, a user of the client computer may employ the browser application to perform various activities over a network (online). However, another application may also be used to perform various online activities.

Client computers 102-106 also may include at least one other client application that is configured to receive and/or send content between another computer. The client application may include a capability to send and/or receive content, or the like. The client application may further provide information that identifies itself, including a type, capability, name, and the like. In one embodiment, client computers 102-106 may uniquely identify themselves through any of a variety of mechanisms, including an Internet Protocol (IP) address, a phone number, Mobile Identification Number (MIN), an electronic serial number (ESN), or other device identifier. Such information may be provided in a network packet, or the like, sent between other client computers, RPE Service Computer 112, Source Data Server Computer 114 and 116, or other computers.

Client computers 102-106 may further be configured to include a client application that enables an end-user to log into an end-user account that may be managed by another computer, such as RPE server computer 112, source data server computers 114-116, or the like. Such an end-user account, in one non-limiting example, may be configured to enable the end-user to manage one or more online activities, including in one non-limiting example, search activities, social networking activities, browse various websites, communicate with other users, or the like. However, participation in such online activities may also be performed without logging into the end-user account.

Wireless network 108 is configured to couple client computers 103-106 and its components with network 110. Wireless network 108 may include any of a variety of wireless sub-networks that may further overlay stand-alone ad-hoc networks, and the like, to provide an infrastructure-oriented connection for client computers 103-106. Such sub-networks may include mesh networks, Wireless LAN (WLAN) networks, cellular networks, and the like. In one embodiment, the system may include more than one wireless network.

Wireless network 108 may further include an autonomous system of terminals, gateways, routers, and the like connected by wireless radio links, and the like. These connectors may be configured to move freely and randomly and organize themselves arbitrarily, such that the topology of wireless network 108 may change rapidly.

Wireless network 108 may further employ a plurality of access technologies including 2nd (2G), 3rd (3G), 4th (4G) 5th (5G) generation radio access for cellular systems, WLAN, Wireless Router (WR) mesh, and the like. Access technologies such as 2G, 3G, 4G, 5G, and future access networks may enable wide area coverage for mobile computers, such as client computers 103-105 with various degrees of mobility. In one non-limiting example, wireless network 108 may enable a radio connection through a radio network access such as Global System for Mobil communication (GSM), General Packet Radio Services (GPRS), Enhanced Data GSM Environment (EDGE), code division multiple access (CDMA), time division multiple access (TDMA), Wideband Code Division Multiple Access (WCDMA), High Speed Downlink Packet Access (HSDPA), Long Term Evolution (LTE), and the like. In essence, wireless network 108 may include virtually any wireless communication mechanism by which information may travel between client computers 103-105 and another computer, network, and the like.

Network 110 is configured to couple network computers with other computers, including, RPE server computer 112, source data server computers 114-116, client computer 102, usage metering computer 106, client computers 103-105 through wireless network 108, or the like. Network 110 is enabled to employ any form of computer readable media for communicating information from one electronic device to another. Also, network 110 can include the Internet in addition to local area networks (LANs), wide area networks (WANs), direct connections, such as through a universal serial bus (USB) port, other forms of computer-readable media, or any combination thereof. On an interconnected set of LANs, including those based on differing architectures and protocols, a router acts as a link between LANs, enabling messages to be sent from one to another. In addition, communication links within LANs typically include twisted wire pair or coaxial cable, while communication links between networks may utilize analog telephone lines, full or fractional dedicated digital lines including T1, T2, T3, and T4, and/or other carrier mechanisms including, for example, E-carriers, Integrated Services Digital Networks (ISDNs), Digital Subscriber Lines (DSLs), wireless links including satellite links, or other communications links known to those skilled in the art. Moreover, communication links may further employ any of a variety of digital signaling technologies, including without limit, for example, DS-0, DS-1, DS-2, DS-3, DS-4, OC-3, OC-12, OC-48, or the like. Furthermore, remote computers and other related electronic devices could be remotely connected to either LANs or WANs via a modem and temporary telephone link. In one embodiment, network 110 may be configured to transport information of an Internet Protocol (IP).

Additionally, communication media typically embodies computer readable instructions, data structures, program modules, or other transport mechanism and includes any information delivery media. By way of example, communication media includes wired media such as twisted pair, coaxial cable, fiber optics, wave guides, and other wired media and wireless media such as acoustic, RF, infrared, and other wireless media.

One embodiment of RPE server computer 112 is described in more detail below in conjunction with FIG. 3. Briefly, however, RPE server computer 112 includes virtually any network computer capable of generating realization rate information for one or more utility service efficiency programs. Such realization rate information may be based on source data provided from multiple sources such as data provided by source data server computers 114-116. Computers that may be arranged to operate as RPE server computer 112 include various network computers, including, but not limited to personal computers, desktop computers, multiprocessor systems, microprocessor-based or programmable consumer electronics, network PCs, server computers, network appliances, and the like.

Although FIG. 1 illustrates RPE server computer 112 as a single computer, the invention is not so limited. For example, one or more functions of the RPE server computer 112 may be distributed across one or more distinct network computers. Moreover, RPE server computer 112 is not limited to a particular configuration. Thus, in one embodiment, RPE server computer 112 may contain a plurality of network computers. In another embodiment, RPE server computer 112 may represent a plurality of network computers that operate using a master/slave approach, where one of the plurality of network computers of RPE server computer 112 operates to manage and/or otherwise coordinate operations of the other network computers. In other embodiments, the RPE server computer 112 may operate as a plurality of network computers within a cluster architecture, a peer-to-peer architecture, and/or even within a cloud architecture. Thus, the invention is not to be construed as being limited to a single environment, and other configurations, and architectures are also envisaged.

One embodiment of source data server computer 114 is described in more detail below in conjunction with FIG. 3. Briefly, however, source data server computer 114 includes virtually any network computer capable of providing source data to RPE server computer 112. Source data server computer 114 can be any computer arranged to provide utility service data, which may include, but is not limited to, energy usage data, weather data, project data, manufacturing data, or the like. Computers that may be arranged to operate as source data server computer 114 may include various network computers, including, but not limited to personal computers, desktop computers, multiprocessor systems, microprocessor-based or programmable consumer electronics, network PCs, server computers, network appliances, and the like.

Although FIG. 1 illustrates source data server computer 114 as a single computer, the invention is not so limited. For example, one or more functions of the source data server computer 114 may be distributed across one or more distinct network computers. Moreover, source data server computer 114 is not limited to a particular configuration. Thus, in one embodiment, source data server computer 114 may contain a plurality of network computers. In another embodiment, source data server computer 114 may represent a plurality of network computers where one of the plurality of network computers operates to manage and/or otherwise coordinate operations of the other network computers. In other embodiments, the source data server computer 114 may operate as a plurality of network computers within a cluster architecture, a peer-to-peer architecture, and/or even within a cloud architecture. Thus, the invention is not to be construed as being limited to a single environment, and other configurations, and architectures are also envisaged. Also, source data server computer 116 may be similar to source data server computer 116. While source data server computer 116 may provide data from different sources than source data server computer 114, in least one of the various embodiments, its description may substantially similar to source data server computer 114.

Illustrative Client Computer

Figure 2:
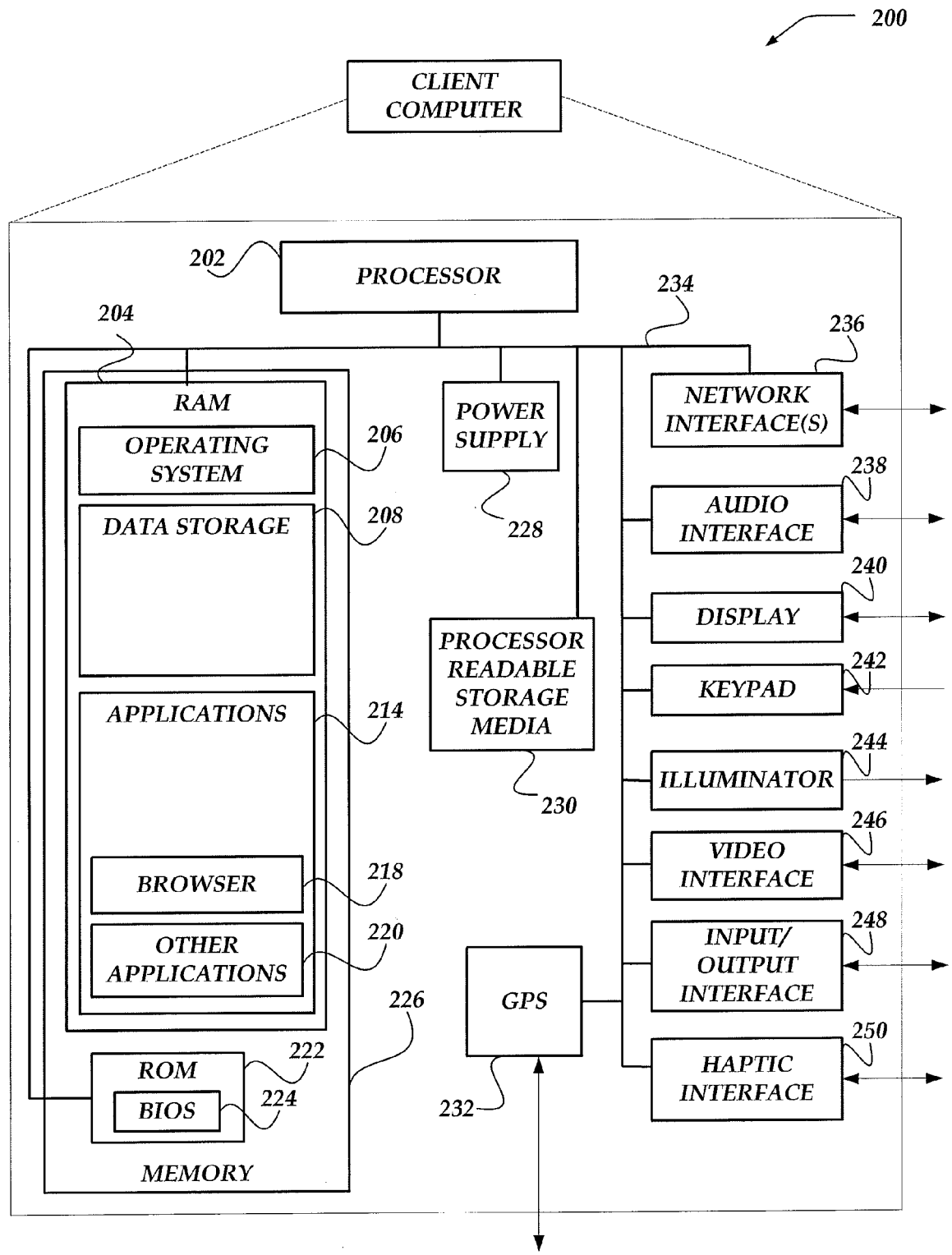
FIG. 2 shows one embodiment of a client computer that may be included in a system.

FIG. 2 shows one embodiment of client computer 200 that may be included in a system implementing embodiments of the invention. Client computer 200 may include many more or less components than those shown in FIG. 2. However, the components shown are sufficient to disclose an illustrative embodiment for practicing the present invention. Client computer 200 may represent, for example, one embodiment of at least one of client computers 102-106 of FIG. 1.

As shown in the figure, client computer 200 includes a processor 202 in communication with a mass memory 226 via a bus 234. In some embodiments, processor 202 may include one or more central processing units (CPU). Client computer 200 also includes a power supply 228, one or more network interfaces 236, an audio interface 238, a display 240, a keypad 242, an illuminator 244, a video interface 246, an input/output interface 248, a haptic interface 250, and a global positioning system (GPS) receiver 232.

Power supply 228 provides power to client computer 200. A rechargeable or non-rechargeable battery may be used to provide power. The power may also be provided by an external power source, such as an alternating current (AC) adapter or a powered docking cradle that supplements and/or recharges a battery.

Client computer 200 may optionally communicate with a base station (not shown), or directly with another computer. Network interface 236 includes circuitry for coupling client computer 200 to one or more networks, and is constructed for use with one or more communication protocols and technologies including, but not limited to, GSM, CDMA, TDMA, GPRS, EDGE, WCDMA, HSDPA, LTE, user datagram protocol (UDP), transmission control protocol/Internet protocol (TCP/IP), short message service (SMS), WAP, ultra wide band (UWB), IEEE 802.16 Worldwide Interoperability for Microwave Access (WiMax), session initiated protocol/real-time transport protocol (SIP/RTP), or any of a variety of other wireless communication protocols. Network interface 236 is sometimes known as a transceiver, transceiving device, or network interface card (NIC).

Audio interface 238 is arranged to produce and receive audio signals such as the sound of a human voice. For example, audio interface 238 may be coupled to a speaker and microphone (not shown) to enable telecommunication with others and/or generate an audio acknowledgement for some action.

Display 240 may be a liquid crystal display (LCD), gas plasma, light emitting diode (LED), organic LED, or any other type of display used with a computer. Display 240 may also include a touch sensitive screen arranged to receive input from an object such as a stylus or a digit from a human hand.

Keypad 242 may comprise any input device arranged to receive input from a user. For example, keypad 242 may include a push button numeric dial, or a keyboard. Keypad 242 may also include command buttons that are associated with selecting and sending images.

Illuminator 244 may provide a status indication and/or provide light. Illuminator 244 may remain active for specific periods of time or in response to events. For example, when illuminator 244 is active, it may backlight the buttons on keypad 242 and stay on while the client computer is powered. Also, illuminator 244 may backlight these buttons in various patterns when particular actions are performed, such as dialing another client computer. Illuminator 244 may also cause light sources positioned within a transparent or translucent case of the client computer to illuminate in response to actions.

Video interface 246 is arranged to capture video images, such as a still photo, a video segment, an infrared video, or the like. For example, video interface 246 may be coupled to a digital video camera, a web-camera, or the like. Video interface 246 may comprise a lens, an image sensor, and other electronics. Image sensors may include a complementary metal-oxide-semiconductor (CMOS) integrated circuit, charge-coupled device (CCD), or any other integrated circuit for sensing light.

Client computer 200 also comprises input/output interface 248 for communicating with external devices, such as a headset, or other input or output devices not shown in FIG. 2. Input/output interface 248 can utilize one or more communication technologies, such as USB, infrared, Bluetooth™, or the like.

Haptic interface 250 is arranged to provide tactile feedback to a user of the client computer. For example, the haptic interface 250 may be employed to vibrate client computer 200 in a particular way when another user of a computer is calling. In some embodiments, haptic interface 250 may be optional.

Client computer 200 may also include GPS transceiver 232 to determine the physical coordinates of client computer 200 on the surface of the Earth. GPS transceiver 232, in some embodiments, may be optional. GPS transceiver 232 typically outputs a location as latitude and longitude values. However, GPS transceiver 232 can also employ other geo-positioning mechanisms, including, but not limited to, triangulation, assisted GPS (AGPS), Enhanced Observed Time Difference (E-OTD), Cell Identifier (CI), Service Area Identifier (SAI), Enhanced Timing Advance (ETA), Base Station Subsystem (BSS), or the like, to further determine the physical location of client computer 200 on the surface of the Earth. It is understood that under different conditions, GPS transceiver 232 can determine a physical location within millimeters for client computer 200; and in other cases, the determined physical location may be less precise, such as within a meter or significantly greater distances. In one embodiment, however, client computer 200 may through other components, provide other information that may be employed to determine a physical location of the computer, including for example, a Media Access Control (MAC) address, IP address, or the like.

Mass memory 226 includes a Random Access Memory (RAM) 204, a Read-only Memory (ROM) 222, and other storage means. Mass memory 226 illustrates an example of computer readable storage media (devices) for storage of information such as computer readable instructions, data structures, program modules or other data. Mass memory 226 stores a basic input/output system (BIOS) 224 for controlling low-level operation of client computer 200. The mass memory also stores an operating system 206 for controlling the operation of client computer 200. It will be appreciated that this component may include a general-purpose operating system such as a version of UNIX, or LINUX™, or a specialized client communication operating system such as Microsoft Corporation's Windows Mobile™, Apple Corporation's IOS™, Google Corporation's Android™ or the Symbian® operating system. The operating system may include, or interface with a Java virtual machine module that enables control of hardware components and/or operating system operations via Java application programs.

Mass memory 226 further includes one or more data storage 208, which can be utilized by client computer 200 to store, among other things, applications 214 and/or other data. For example, data storage 208 may also be employed to store information that describes various capabilities of client computer 200. The information may then be provided to another computer based on any of a variety of events, including being sent as part of a header during a communication, sent upon request, or the like. Data storage 208 may also be employed to store social networking information including address books, buddy lists, aliases, user profile information, or the like. Further, data storage 208 may also store messages, web page content, or any of a variety of user generated content. At least a portion of the information stored in data storage 208 may also be stored on another component of client computer 200, including, but not limited to processor readable storage media 230, a disk drive or other computer readable storage devices (not shown) within client computer 200.

Processor readable storage media 230 may include volatile, nonvolatile, removable, and non-removable media implemented in any method or technology for storage of information, such as computer- or processor-readable instructions, data structures, program modules, or other data. Examples of computer readable storage media include RAM, ROM, Electrically Erasable Programmable Read-only Memory (EEPROM), flash memory or other memory technology, Compact Disc Read-only Memory (CD-ROM), digital versatile disks (DVD) or other optical storage, magnetic cassettes, magnetic tape, magnetic disk storage or other magnetic storage devices, or any other physical medium which can be used to store the desired information and which can be accessed by a computer. Processor readable storage media 230 may also be referred to herein as computer readable storage media and/or computer readable storage device.

Applications 214 may include computer executable instructions which, when executed by client computer 200, transmit, receive, and/or otherwise process network data. Network data may include, but is not limited to, messages (e.g. SMS, Multimedia Message Service (MMS), instant message (IM), email, and/or other messages), audio, video, and enable telecommunication with another user of another client computer. Applications 214 may include, for example, a browser 218, and other applications 220.

Browser 218 may include virtually any application configured to receive and display graphics, text, multimedia, messages, and the like, employing virtually any web based language. In one embodiment, the browser application is enabled to employ HDML, WML, WMLScript, JavaScript, SGML, HTML, XML, and the like, to display and send a message. However, any of a variety of other web-based programming languages may be employed. In one embodiment, browser 218 may enable a user of client computer 200 to communicate with another network computer, such as RPE server computer 112 of FIG. 1.

Other applications 220 may include, but are not limited to, calendars, search programs, email clients, IM applications, SMS applications, voice over Internet Protocol (VOIP) applications, contact managers, task managers, transcoders, database programs, word processing programs, security applications, spreadsheet programs, games, search programs, and so forth.

Illustrative Network Computer

Figure 3:
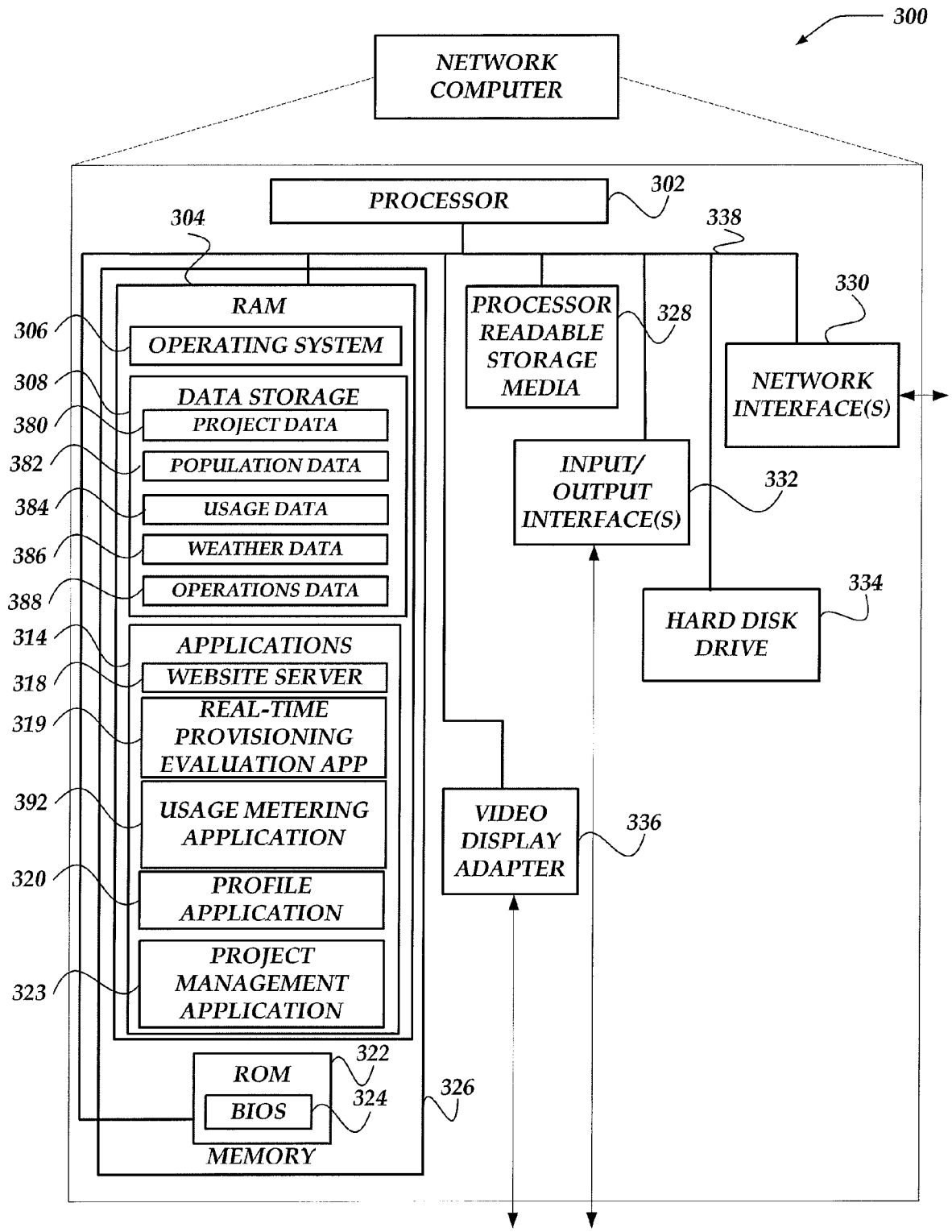
FIG. 3 illustrates one embodiment of a network computer that may be included in a system.

FIG. 3 shows one embodiment of a network computer 300, according to one embodiment of the invention. Network computer 300 may include many more or less components than those shown. The components shown, however, are sufficient to disclose an illustrative embodiment for practicing the invention. Network computer 300 may be configured to operate as a server, client, peer, a host, node, or any other computer. Network computer 300 may represent, for example RPE server computer 112, source data server computer 114, and/or source data server computer 116 of FIG. 1, and/or other network computers.

Network computer 300 includes processor 302, processor readable storage media 328, network interface unit 330, an input/output interface 332, hard disk drive 334, video display adapter 336, and memory 326, all in communication with each other via bus 338. In some embodiments, processor 302 may include one or more central processing units.

As illustrated in FIG. 3, network computer 300 also can communicate with the Internet, or some other communications network, via network interface unit 330, which is constructed for use with various communication protocols including the TCP/IP protocol. Network interface unit 330 is sometimes known as a transceiver, transceiving device, or network interface card (NIC).

Network computer 300 also comprises input/output interface 332 for communicating with external devices, such as a keyboard, or other input or output devices not shown in FIG. 3. Input/output interface 332 can utilize one or more communication technologies, such as USB, infrared, Bluetooth™, or the like.

Memory 326 generally includes RAM 304, ROM 322 and one or more permanent mass storage devices, such as hard disk drive 334, tape drive, optical drive, and/or floppy disk drive. Memory 326 stores operating system 306 for controlling the operation of network computer 300. Any general-purpose operating system may be employed. Basic input/output system (BIOS) 324 is also provided for controlling the low-level operation of network computer 300.

Although illustrated separately, memory 326 may include processor readable storage media 328. Processor readable storage media 328 may be referred to and/or include computer readable media, computer readable storage media, and/or processor readable storage device. Processor readable storage media 328 may include volatile, nonvolatile, removable, and non-removable media implemented in any method or technology for storage of information, such as computer readable instructions, data structures, program modules, or other data. Examples of processor readable storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other media which can be used to store the desired information and which can be accessed by a computer.

Memory 326 further includes one or more data storage 308, which can be utilized by network computer 300 to store, among other things, applications 314 and/or other data. For example, data storage 308 may also be employed to store information that describes various capabilities of network computer 300. The information may then be provided to another computer based on any of a variety of events, including being sent as part of a header during a communication, sent upon request, or the like. Data storage 308 may also be employed to store messages, web page content, or the like. At least a portion of the information may also be stored on another component of network computer 300, including, but not limited to processor readable storage media 328, hard disk drive 334, or other computer readable storage medias (not shown) within network computer 300.

Data storage 308 may include a database, text, spreadsheet, folder, file, or the like, that may be configured to maintain and store user account identifiers, user profiles, email addresses, IM addresses, and/or other network addresses; or the like. Data storage 308 may further include program code, data, algorithms, and the like, for use by a processor, such as processor 302 to execute and perform actions. In one embodiment, at least some of data store 308 might also be stored on another component of network computer 300, including, but not limited to processor-readable storage media 328, hard disk drive 334, or the like.

Data storage 308 may include project data 380, population data 382, usage data 384, weather data 386, and/or operations data 388. Project data 380 may include project details, timeline, and expected utility service demand reduction data for one or more facilities. Population data 382 may include information related to candidate facilities which may be used as comparison facilities, including attributes which may be used to determine similarity to treatment facilities. Usage data 384 may include information related to the utility service demand for some or all treatment facilities and candidate comparison facilities. Weather data 386 may include information about the weather experienced by treatment facilities and comparison facilities. Operations data 388 (operational data) may include information from one or more sources of data about aspects of the operations of treatment facilities and comparison facilities that may impact their service demand requirements.

Applications 314 may include computer executable instructions, which may be loaded into mass memory and run on operating system 306. Examples of application programs may include transcoders, schedulers, calendars, database programs, word processing programs, Hypertext Transfer Protocol (HTTP) programs, customizable user interface programs, IPSec applications, encryption programs, security programs, SMS message servers, IM message servers, email servers, account managers, and so forth. Applications 314 may also include website server 318, real-time provisioning evaluation (RPE) application 319, usage metering application 392, profile application 320, or project management application 323.

Website server 318 may represents any of a variety of information and services that are configured to provide content, including messages, over a network to another computer. Thus, website server 318 can include, for example, a web server, a File Transfer Protocol (FTP) server, a database server, a content server, or the like. Website server 318 may provide the content including messages over the network using any of a variety of formats including, but not limited to WAP, HDML, WML, SGML, HTML, XML, Compact HTML (cHTML), Extensible HTML (xHTML), or the like.

Illustrative Logical System

Figure 4:
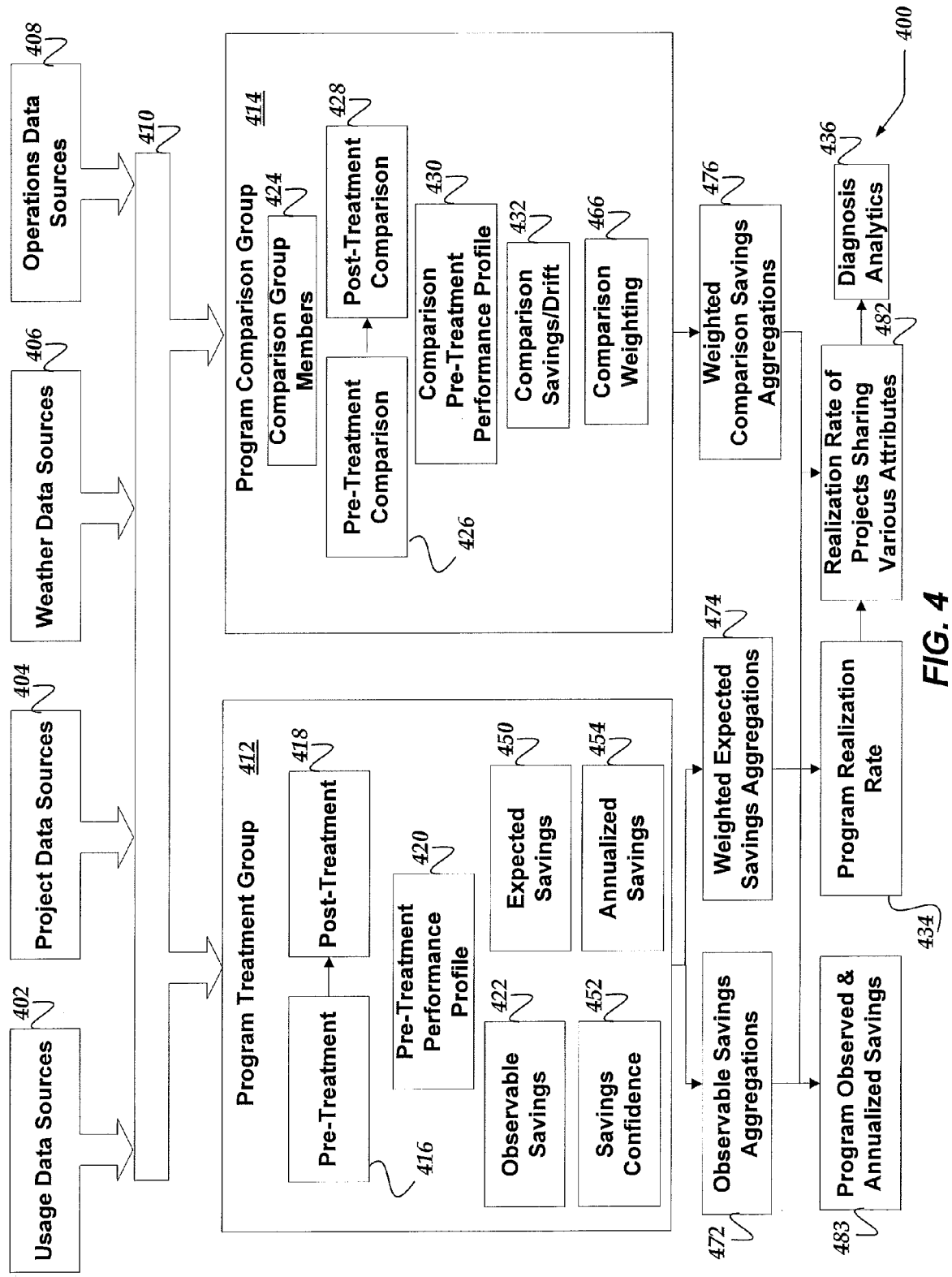
FIG. 4 shows a logical diagram of a system for real-time provisional evaluation of realization in accordance with at least one of the various embodiments

FIG. 4 shows a logical diagram of system 400 for real-time provisional evaluation of realization in accordance with at least one of the various embodiments.

In at least one of the various embodiments, usage information from usage data sources 402, project information from project data sources 404, weather information from weather data sources 406, and optionally other information from other data sources 408, may be provided over network 410 to program treatment group component 412 and program comparison group component 414.

In at least one of the various embodiments, as facilities are determined to be eligible for one or more treatments that may be associated with a project, the RPE application may be arranged to associate them with one or more program treatment groups, such as, program treatment group 412, for the each particular project. In at least one of the various embodiments, RPE application 319 and/or project management application 323 may be arranged to maintain information sufficient for determining the time a project treatment occurred. Such information may be stored in a database or other storage, such as, project data 380. In at least one of the various embodiments, information related to the specifics of the project and its performance may be included in project information from project data sources 404.

In at least one of the various embodiments, for each facility associated with the program treatment group 412, a pre-treatment performance profile may be generated by pre-treatment performance profile component 420 and/or profile application 320. In at least one of the various embodiments, each pre-treatment performance profile may be stored in project data 380, one or more databases, or any other form of data storage. In at least one of the various embodiments, the pre-treatment performance profile for a facility may be generated based on at least historical usage information from usage data sources 402 and historical weather information from weather data sources 406.

In at least one of the various embodiments, observable savings component 422 may be arranged to generate and/or store one or more values that may represent the demand service reduction (savings) for each facility that may be attributable to the treatment. In at least one of the various embodiments, savings confidence component 452 may be arranged to generate and/or store one or more values that may represent the savings confidence for the observable savings 422. In at least one of the various embodiments, RPE application 319 may be arranged to perform some or all of the actions associated with observable savings component 422 and savings confidence 452. In at least one of the various embodiments, expected savings component 450 may be arranged to generate and/or store one or more values that may represent the demand service reduction (savings) that are expected for each project at each facility as a result of the treatment. Additional components in system 400 may contribute to the generation of a treatment savings value, such as, usage data sources 402, weather data sources 406, project data sources 404, operations data sources 408, pre-treatment performance profile 420, or the like. In at least one of the various embodiments, an annualized savings component 454 may generate and/or store a typical annual savings amount associated with the project, which may be based on the observable savings 422 and savings confidence 452.

In at least one of the various embodiments, if a facility is associated with the program treatment group 412, one or more comparison facilities that correspond to the treatment facility may be determined. In at least one of the various embodiments, comparison facilities may be determined and/or grouped by comparison group members 424.

In at least one of the various embodiments, the utility service usage of each comparison facility associated with a treatment facility may be split into pre-treatment comparison component 426 and post-treatment comparison component 428 based on the date of the treatment of the corresponding treatment facility. Thus, if a comparison facility's corresponding treatment facility is associated with pre-treatment component 416 prior to a given date, the comparison facility may be associated with pre-treatment comparison component 426 from prior to the same date. Likewise, if a comparison facility's corresponding treatment facility is associated with post-treatment component 418 after a given date, the comparison facility may be associated with post-treatment comparison component 428 after the same date.

In at least one of the various embodiments, for each comparison facility associated with the program comparison group 414, a comparison pre-treatment performance profile may be generated by comparison pre-treatment performance profile component 430. In at least one of the various embodiments, each comparison pre-treatment performance profile ("comparison profile") may be stored in population data 382, one or more databases, or any other form of data storage. In at least one of the various embodiments, the comparison profile for a comparison facility may be generated based on at least historical usage information from usage data sources 402 historical weather information from weather data sources 406 and operations data from operations data sources 408.

In at least one of the various embodiments, comparison savings/drift component 432 may be arranged to generate and/or store one or more values that may represent the usage savings for each comparison facility. In at least one of the various embodiments, the comparison weighting component 466 may generate and/or store one or more values that may represent the portion of a treatment facility that each comparison facility represents. For example, if a comparison facility is one of three comparison facilities associated with a single treatment facility, then the weight of that comparison facility may be calculated to be ⅓. Various components in system 400 may contribute to the generation of a comparison savings value, such as, usage data sources 402, weather data sources 406, project data sources 404, other data sources 408, comparison pre-treatment performance profile 430, or the like.

In at least one of the various embodiments, initially the facility may be associated with program comparison group 414. If a treatment is completed on a facility associated with program comparison group 414, it may be re-assigned to program treatment group 412.

In at least one of the various embodiments, observable savings 422 associated with each project at each treatment facility may be aggregated by the observable savings aggregations component 472. In at least one of the various embodiments, expected savings 450 associated with each project at each treatment facility may be weighted by savings confidence 452 and aggregated by the weighted expected savings aggregations component 474. In at least one of the various embodiments, comparison savings 432 associated with each comparison facility are weighted by the comparison weighting 466 and aggregated by the weighted comparison savings aggregations component 476.

In at least one of the various embodiments, program realization rate component 434 may be arranged to determine at least one or more realization rates for one or more projects and/or programs. In at least one of the various embodiments, the realization rate may be determined and/or updated as the one or more projects or programs progress. In at least one of the various embodiments, program realization rates may be calculated as the ratio of observable savings aggregations 472, adjusted for weighted comparison savings aggregations 476, to the weighted expected savings aggregations 474.

In at least one of the various embodiments, the realization rate of projects sharing various attributes 482 may be calculated. In at least one of the various embodiments, diagnosis analytics component 436 may be arranged to combine the realization rate of projects sharing various attributes 482 and the program realization rate 434 to generate and/or store one or more attributes of projects that may be associated with projects, facilities, or the like, possessing realization rates substantially higher or substantially lower than typical for the program.

In at least one of the various embodiments, RPE application 319, profile application 320, and project management application 323 may be arranged to perform one or more of the actions performed by the components of system 400.

Figure 5:
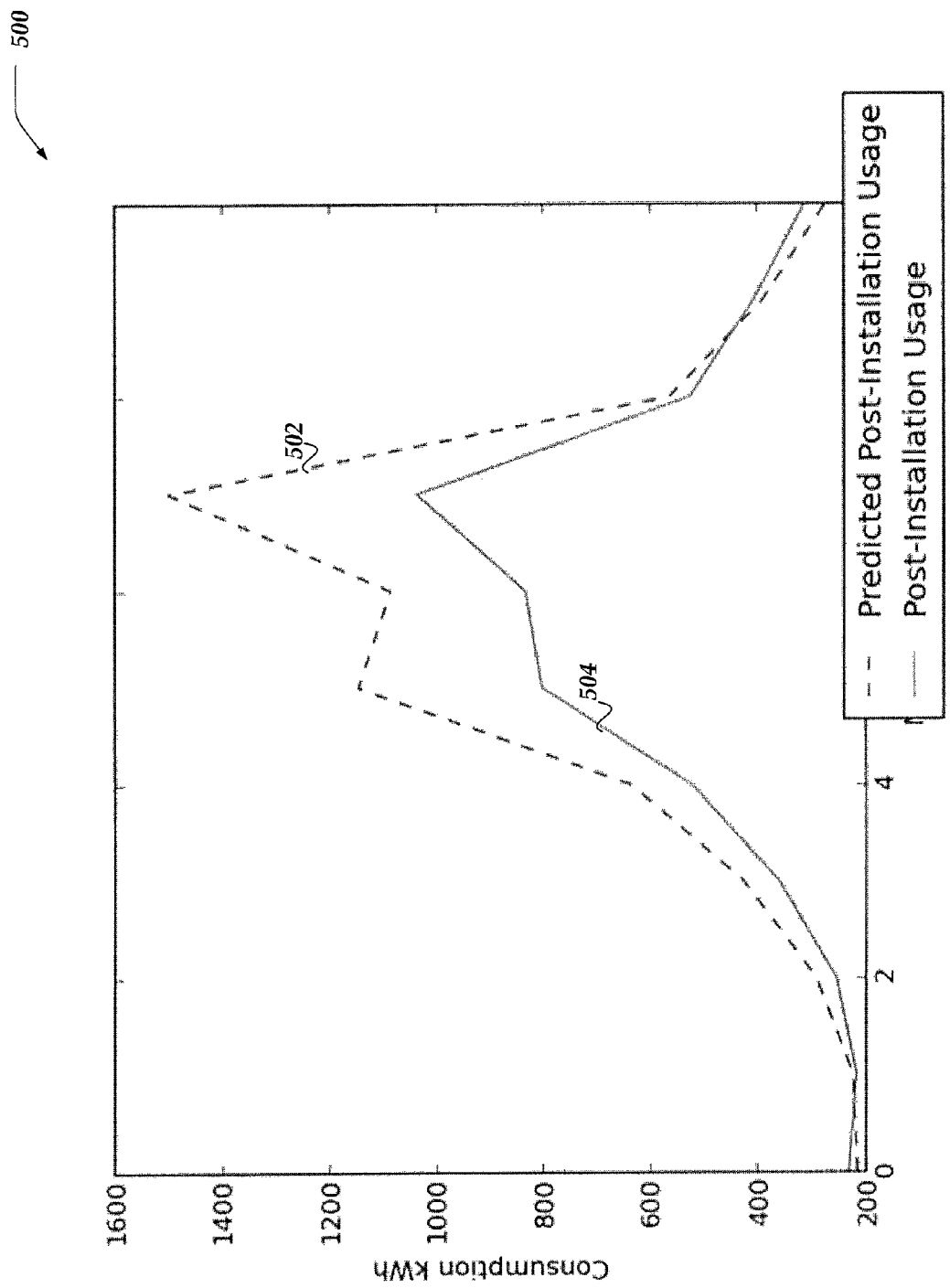
FIG. 5 shows a graph illustrating pre-treatment usage predicted by a pre-treatment performance profile and current usage information in accordance with at least one of the various embodiments.

FIG. 5 shows graph 500 for comparing pre-treatment usage predicted by a pre-treatment performance profile and current usage information for determining treatment savings information for a project in accordance with at least one of the various embodiments. The dashed line, line 502, indicates the expected usage of the facility generated using the pre-treatment performance profile and the current weather information. The solid line, line 504, indicates the actual usage for the facility generate based on current usage information. The treatment savings for the project may be determine based in part on a comparison of line 502 and line 504. Accordingly, in at least one of the various embodiments, the treatment savings for the project may be determined based in part on the volume between line 502 and line 504.

Generalized Operation

The operation of certain aspects of the invention will now be described with respect to FIGS. 6-12. In at least one of various embodiments, processes 600, 700, 800, 900, 1000, 1100, and 1200 described in conjunction with FIGS. 6-12, respectively, may be implemented by and/or executed on a single network computer, such as network computer 300 of FIG. 3. In other embodiments, these processes or portions of these processes may be implemented by and/or executed on a plurality of network computers, such as network computer 300 of FIG. 3. However, embodiments are not so limited and various combinations of network computers, or the like, may be utilized.

Figure 6A:
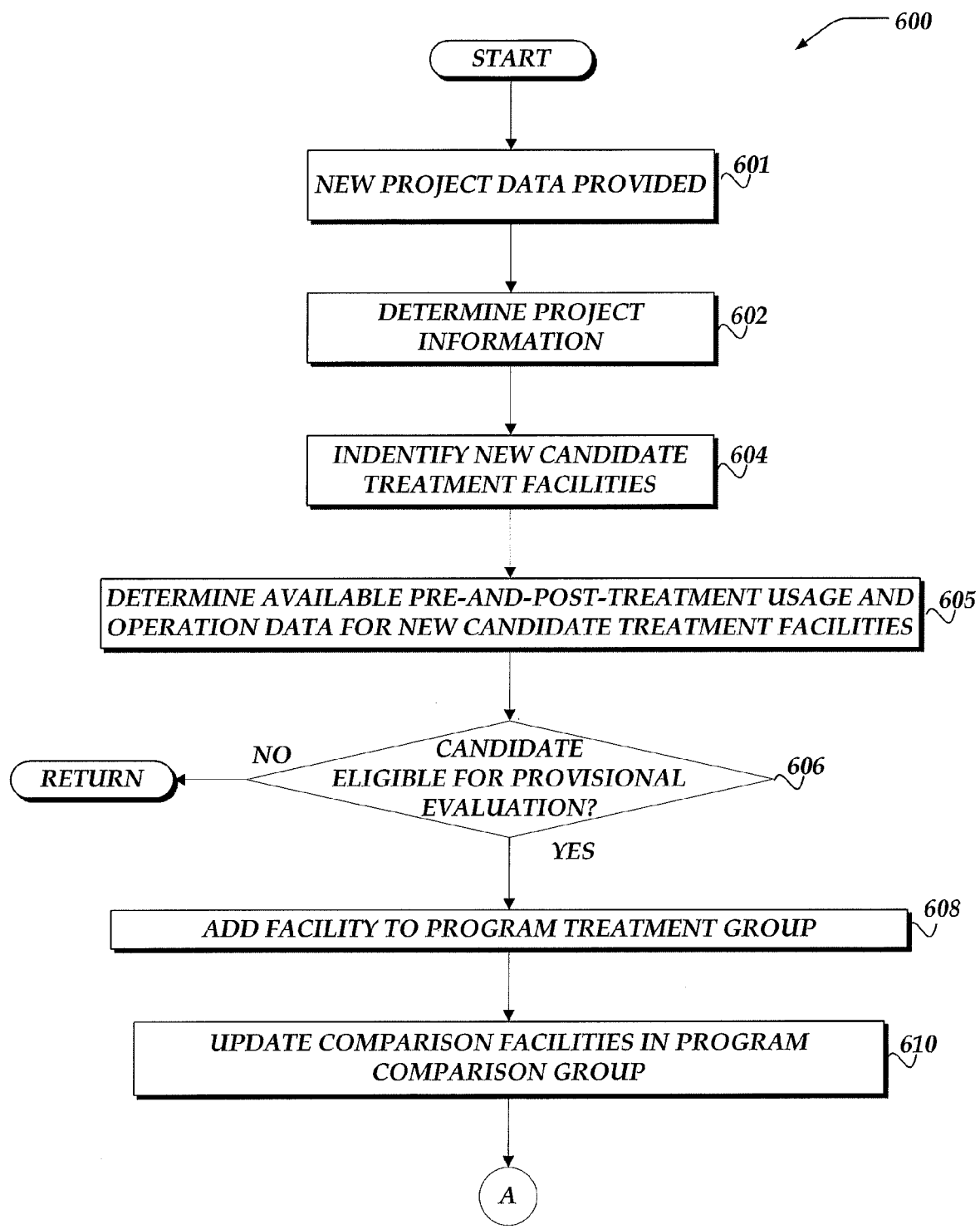
FIGS. 6A-6C show portions of an overview flowchart a process for real time provisional evaluation of utility programs in accordance with at least one of the embodiments.
Figure 6B:
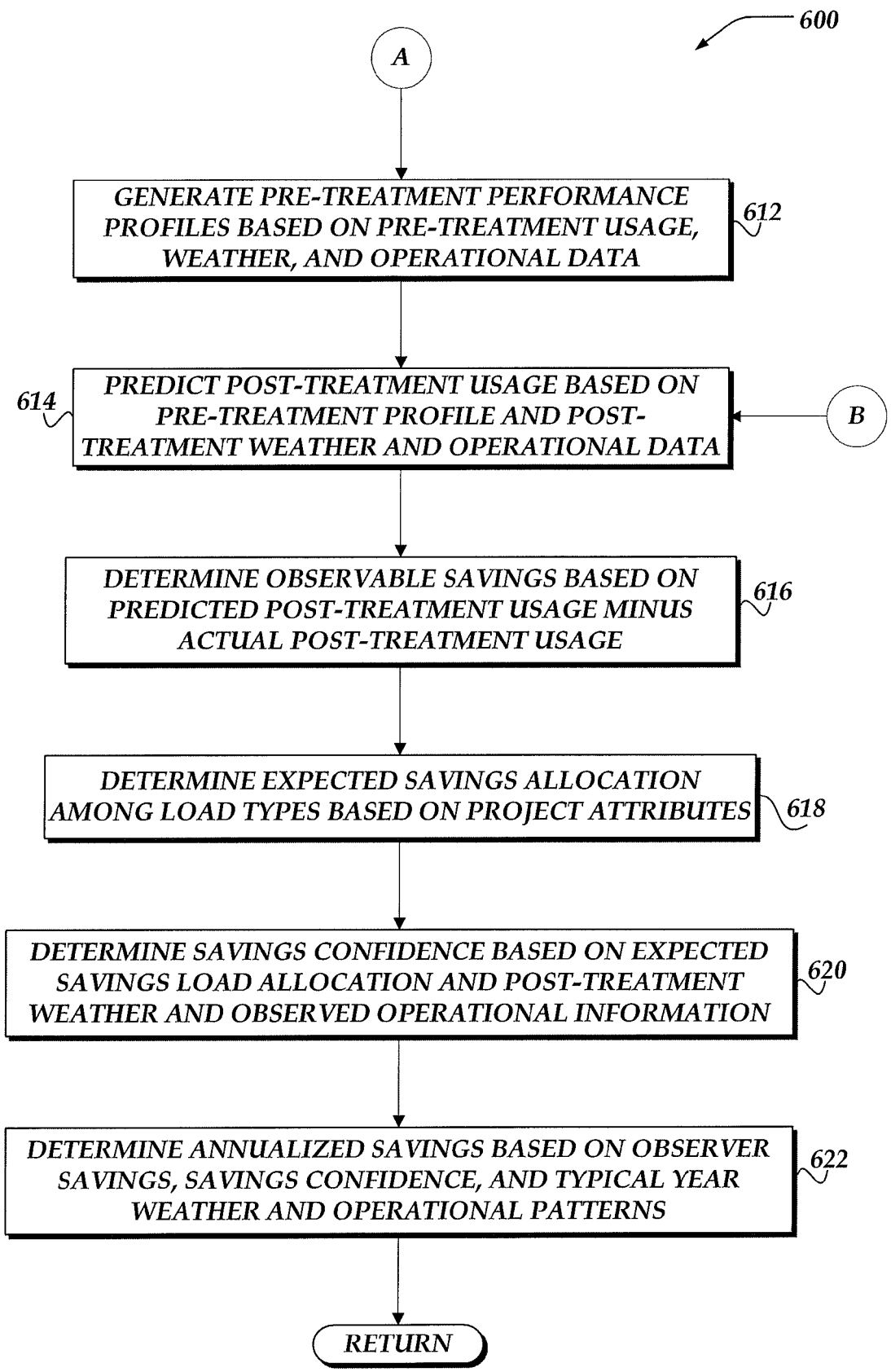
Figure 6C:
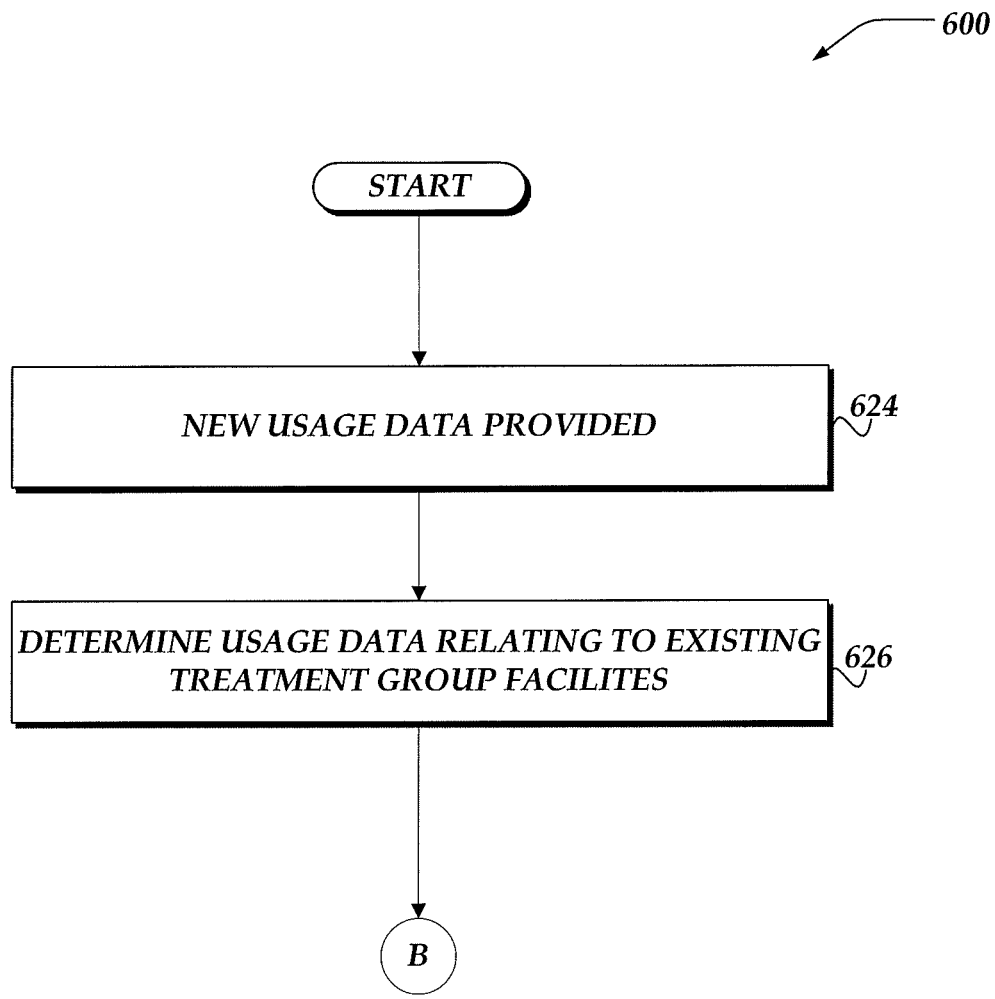

FIGS. 6A, 6B and 6C show an overview flowchart of process 600 for real time provisional evaluation of utility programs in accordance with at least one of the embodiments. Starting in FIG. 6A, process 600 may be initiated if new project data or new usage data is available. After a start block, if new project data 601 becomes available, at block 602, in at least one of the various embodiments, project information for one or more projects may be determined. In at least one of the various embodiments, project information may be determined from various sources, including, for examples, project data sources 404.

In at least one of the various embodiments, project information includes one or more characteristics of a project, including, but not limited to, program start time, program stop time, facility attributes used to select appropriate comparison facilities, attributes used to determine eligibility for inclusion in provisional evaluation of the effectiveness of the utility efficiency program, or the like. Attributes used to select appropriate comparison facilities include facility type and function, occupant characteristics for residential buildings (e.g., number and age of occupants, or the like), structural characteristics of the facility (e.g. square footage, materials, window area, or the like), insulation, location, usage history, or the like. In at least one of the various embodiments, facility eligibility for inclusion in provisional evaluation of the effectiveness of the utility efficiency program may include thresholds for characteristics including availability of pre-treatment usage data, aspects of occupation or usage of the facility, availability of pre-treatment operational data, or the like.

In at least one of the various embodiments, project information may also include information such as expected performance improvements associated with the project, estimated number of participants, incentive program information associated with the projects, or the like.

At block 604, in at least one of the various embodiments, one or more new candidate treatment facilities may be determined. New candidate treatment facilities may be facilities receiving treatment services from the utility as a part of the program which had not previously been either identified for inclusion in the treatment group or determined to be ineligible for inclusion in the provisional evaluation of the effectiveness of the utility efficiency program. New candidate treatment facilities may be recorded, tagged and/or marked as a candidate treatment facility, the record of which may be stored in computer storage (e.g., data storage 308), a database, or the like, before control flows to decision block 606.

At decision block 606, in at least one of the various embodiments, if the candidate treatment facility may be eligible for provisional evaluation, control may flow to block 608; otherwise the candidate treatment facility may be recorded as being ineligible for inclusion in the provisional evaluation of the effectiveness of the utility efficiency program, but is otherwise ignored by system. In at least one of the various embodiments, a candidate treatment facility may be determined to be eligible for real time provisional evaluation if it meets certain criteria. Note that criteria for participating in the program may be separate from criteria for being eligible for inclusion in the provisional evaluation of the effectiveness of the utility efficiency program.

In at least one of the various embodiments, a candidate treatment facility may be eligible for inclusion in the provisional evaluation of the effectiveness of the utility efficiency program if there is historical usage information sufficient for generating a pre-treatment performance profile. In at least one of the various embodiments, eligibility may be based on historical usage information for the facility for over defined length of time, such as, one month, three months, one year, two years, or the like. Also, in at least one of the various embodiments, an eligibility requirement may include that the historical usage information may be from the same occupants over the defined length of time. For example, assuming eligibility requires at least one consecutive year of historical usage information, if the consecutive one year of historical information for a facility includes three months of historical usage information generated for the Smith family and nine months of historical usage information for generated for the Lee family, the candidate facility may be excluded from RPE.

Also, in at least one of the various embodiments, an eligibility requirement may include that historical operational information over the defined length of time may be present as well. Also, in at least one of the various embodiments, an eligibility requirement may be that historical operational information be from the same occupants over the defined length of time.

In at least one of the various embodiments, RPE application 319 may determine if sufficient usage information may be available by communicating over a network with a computer that may be part of the utility. In some cases, the RPE application 319 may download the historical usage information from a utility computer. If the historical usage information is determined, RPE application 319 may validate the information and determine if it may be sufficient for RPE. In at least one of the various embodiments, if the historical usage information may be insufficient for RPE, the facility may remain in the program, but it may be excluded from inclusion in the provisional evaluation.

At block 608, in at least one of the various embodiments, facilities determined to be eligible for RPE may be recorded, marked, and/or tagged as treatment facilities and associated with the program treatment group associated the program. In at least one of the various embodiments, RPE application 319 may be arranged to employ one or more well-known data structures for storing information related to treatment facilities in a database, or the like.

At block 610, in at least one of the various embodiments, one or more comparison facilities may be determined that correspond with the treatment facility. In at least one of the various embodiments, comparison facilities may be determined based on one or more similarities with the treatment facility. (See, FIG. 7).

In at least one of the various embodiments, each time a program and/or a project is evaluated, different comparison facilities may be determined to correspond to a treatment facility. Also, in at least one of the various embodiments, each time a program and/or a project is evaluated there may be different number of comparison facilities determined to correspond to a treatment facility. In some cases, the number of comparison facilities may change because one or more comparison facilities may be removed from a comparison group and into the treatment group if they are determined to become treatment facilities. Next, control may flow through sheet connector A to the sheet connector A in FIG. 6B.

In FIG. 6B, at block 612, in at least one of the various embodiments, pre-treatment performance profiles may be generated for the treatment facility. In at least one of the various embodiments, RPE application 319 may be arranged to generate the pre-treatment performance profile for the treatment facility. (See, FIG. 8).

At block 614, in at least one of the various embodiments, RPE application 319 may predict post-treatment usage information based on at least the pre-treatment performance profile and weather information and/or operational information. The post-treatment usage prediction may represent the services (e.g., electricity, water, natural gas, or the like) that the facility would have consumed absent the treatments associated with the project. Accordingly, in at least one of the various embodiments, savings information may be generated based on a comparison of the pre-treatment usage value and the actual usage value.

At block 616, in at least one of the various embodiments, RPE application 319 may determine observable savings information based on at least the predicted post-treatment usage and the actual usage information for the post-treatment period. In at least one of the various embodiments, observable savings information for the treatment facility may be generated as usage information. The observable savings value may represent the services (e.g., electricity, water, natural gas, or the like) that the facility would have consumed absent the treatments associated with the project but did not given the actual usage values.

At block 618, in at least one of the various embodiments, RPE application 319 may determine the allocation of the expected savings among the different load types in a typical year based on at least the project data. The allocation of the expected savings among the different load types in a typical year represents the extent to which a given combination of weather conditions and operational patterns give rise to the expected savings. This allocation may be used when comparing the actual post-treatment weather to a typical year's weather in order to determine how much savings are observable.

At block 620, in at least one of the various embodiments, RPE application 319 may determine the savings confidence based the load allocation and some combination of the weather information observed, operational information observed, and time that has passed during the post-treatment period. The savings confidence represents the extent to which expected combinations of weather conditions and operational patterns during a typical year which give rise to the expected savings have been observed during the post-treatment period. In at least one of the various embodiments, the savings confidence may be calculated as:

$$\text{Savings Confidence} = \text{Heating Allocation} * (\text{HDD During Post-Treatment Period}/\text{HDD in a typical year}) + \text{Cooling Allocation} * (\text{CDD During Post-Treatment Period}/\text{CDD in a typical year}) + \text{Baseload Allocation} * (\text{length of time during Post-Treatment Period}/\text{length of time in a typical year})$$

For residential or for treatments which are irrespective of operational characteristics of the facility.

For example, a project's treatments may affect a facility such that service usage is expected to be lower during conditions that require heating (cold weather) and cooling (hot weather), with the savings allocation of 25% heating, 75% cooling irrespective of operational considerations. If the post-treatment period includes only $1/10^{th}$ of the cold weather of a typical year, but includes three-quarters of the hot weather of a typical year, then the savings confidence would be.

For treatments which are impacted by the operations of the facility (e.g. a pump or motor used in an industrial or manufacturing process, or lighting treatment which depends on the extent to which a facility is used for shift work during a period), a generalized form of this equation must be used:

$$\text{Savings Confidence}_j = \Sigma X_{i,j} * (\text{Heating Allocation}_j * \text{HDD}_i / \text{HDD}_{typical\,year} + \text{Cooling Allocation}_j * \text{CDD}_i / \text{CDD}_{typical\,year} + \text{Base Allocation}_j * \text{time}_i / \text{time}_{typical\,year}) X_{j,typical\,year}$$

Summed from observable post-treatment period 1 through n, and defined for operational or production types 0 through m, where:

Savings Confidence$_j$ represents the savings confidence in the savings associated with the jth type of production or operation and Savings Confidence$_0$ represents the savings confidence associated with savings that are irrespective of production or operation n represents the number of observable post-treatment periods for which data is available m represents the number of different types of production or operation which factor into the prediction of usage and which are modeled as a part of the pre-treatment performance profile $X_{i,j}$ is the amount of operation or production of the jth type, during the ith time period and $X_{i,0}$ is defined to be 1.

$X_{typical\ year_j}$ is the operation or production of the jth type during the course of a typical year and $X_{j,typical\ year}$ is defined to be 1.

Heating Allocation$_j$ is defined to be the allocation of the savings for type of production or operation of the jth type that is expected to occur under heating conditions and Heating Allocation$_0$ is defined to be the portion of the savings that are expected to obtain irregardless of production or operation during heating conditions.

HDD$_i$ is defined to be the number of heating degree days (given the facility-specific base temperature) which were observed during the ith period at the facility's location.

HDD$_{typical\ year}$ is defined to be the number of heating degree days (given the facility-specific base temperature) at the facility's location during a typical year.

Cooling Allocation$_j$ is defined to be the allocation of the savings for type of production or operation of the jth type that is expected to occur under cooling conditions and Cooling Allocation$_0$ is defined to be the portion of the savings that are expected to obtain irregardless of production or operation during cooling conditions.

CDD$_i$ is defined to be the number of cooling degree days (given the facility-specific base temperature) which were observed during the ith period at the facility's location.

CDD$_{typical\ year}$ is defined to be the number of cooling degree days (given the facility-specific base temperature) at the facility's location during a typical year.

Base Allocation$_j$ is defined to be the allocation of the savings for type of production or operation of the jth type that is expected to occur regardless of weather conditions and Base Allocation$_0$ is defined to be the portion of the savings that are expected to obtain irregardless of both production or operation and weather conditions.

time$_i$ is defined to be the length of time (typically expressed in an appropriate unit, such as minutes, hours, or days) during the ith period.

time$_{typical\ year}$ is defined to be the length of a typical year.

This savings confidence can be used when comparing the actual post-treatment weather to a typical year's weather in order to determine how much savings are observable.

At block 622, in at least one of the various embodiments, the annualized savings information may be determined. In at least one of the various embodiments, annualized savings information may be determined based on the observable savings and savings confidence. Annualized savings for all types of operation or production that gives rise to savings may be given by:

$$Annualized\ Savings = Observable\ Savings/Savings\ Confidence$$

Annualized savings can be used when presenting the likely project or program savings to users. Next, control may be returned to a calling process.

FIG. 6C, shows a portion of process 600, in accordance with at least one of the various embodiments. After a start block, at block 624, new usage data may be provided to process 600. Usage data may be provided from one or more usage data sources, such as, usage data sources 402. At block 626, in at least one of the various embodiments, the usage data the relates to the existing and/or current treatment group facilities may be determined. Next, control may flow through sheet connector B back to block 614 in FIG. 6B.

Figure 7:
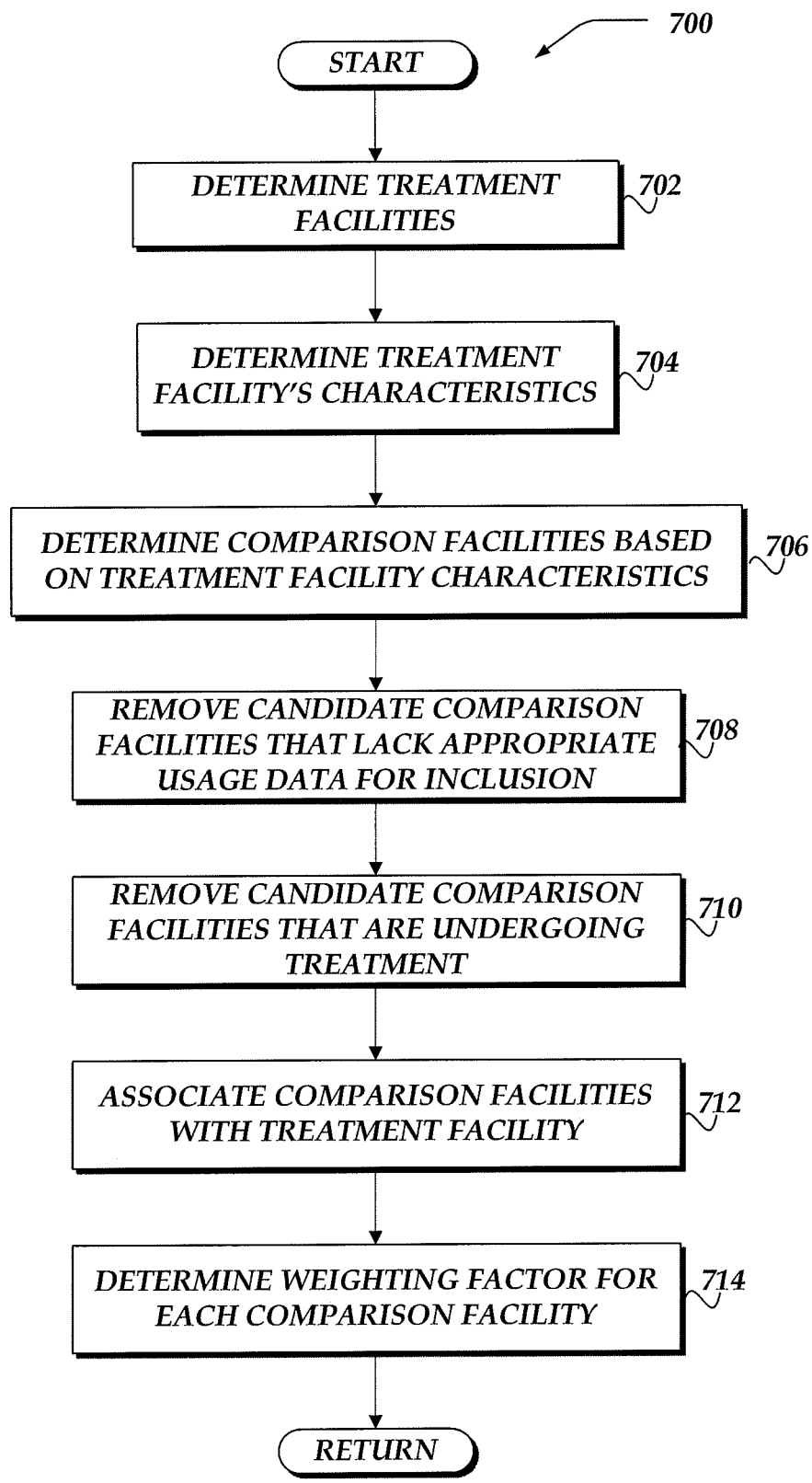
FIG. 7 shows a flowchart for a process for determining comparison group members in accordance with at least one of the various embodiments.

FIG. 7 shows a flowchart for process 700 for determining comparison group members in accordance with at least one of the various embodiments. After a start block, at block 702, in at least one of the various embodiments, a treatment facility may be determined. In at least one of the various embodiments, a facility may be determined to be a treatment facility if it is selected to participate in one of more projects associated with one or more service utility performance programs, such as, energy efficiency programs.

At block 704, in at least one of the various embodiments, the characteristics of the treatment facility may be determined. In at least one of the various embodiments, project information that may be located in project data sources 404, may include structural and static characteristics of the treatment facility. In at least one of the various embodiments, structural characteristics may include, window quantity, siding material, roofing material, structure size (e.g., square footage), number of floors, number of entrances and exits, type of heating plant, type of cooling plant, foundation type, geographic location, or the like.

In at least one of the various embodiments, characteristics corresponding to the demographics of occupants of the treatment facility may be determined. In at least one of the various embodiments, demographic characteristics may include, number and ages of family members living in the facility, income of occupants, occupant employment status/careers, education level, or the like.

In at least one of the various embodiments, characteristics corresponding to the utility service usage of the facility may be determined, such as, water consumption, power consumption, or the like. In most embodiments, the utility will collect metered usage information for defined periods of time for each facility that consumes utility services. For example, an electrical power utility may track the monthly electrical power demand of a facility using one or more electrical service meters. Usage information, that may be the same information used by the utility to generate the bill/invoice for services, may be used to characterize the facility based on its service demand and/or service usage.

At block 706, in at least one of the various embodiments, one or more comparison facilities may be determined based on one or more of the characteristics of the treatment facility. In at least one of the various embodiments, facilities may be selected from the universe of facilities receiving services from the utility. Comparison facilities may be determined based on one or more conditions based on the characteristics of the treatment facility. In at least one of the various embodiments, comparison facility may be determined such that they may be similar in physical and service usage characteristics to their corresponding treatment facility. In at least one of the various embodiments, a plurality of comparison facilities may be assigned to a particular treatment facility for a project.

In at least one of the various embodiments, RPE application 319 may be arranged to match comparison facilities to treatment facilities using one or more ranges of values for characteristics rather than an exact match. For example, if a treatment facility has 2,450 square feet of living space, candidate comparison facilities may include facility have living space in the range of 2,100-2,600 square feet, or the like. Also, in at least one of the various embodiments, RPE application 319 may be arranged to employ a subset of available treatment facilities for determining comparison facilities. The subset may be determined using configuration settings, and/or user input. For example, in at least one of the various embodiments, if a treatment facility has one hundred known physical characteristics, RPE application 319 may be arranged and/or configured to use five, or the like, for determining matches.

In at least one of the various embodiments, service usage characteristics of facilities may be used as criteria for determining comparison facilities. In at least one of the various embodiments, service usage characteristics may be defined in terms of individual values and/or a range of values. In at least one of the various embodiments, service usage characteristics may be defined in term of bands or tiers, such as, low, medium, and high, where each band corresponds to a range of service usage. For example, facilities having an annualized power demand of 1650 kWhs may be determined to low users, with 3300 kWhs users and 4950 kWhs users defined as medium and high users respectively.

In at least one of the various embodiments, in addition to sufficiently matching the characteristics of the treatment facility, comparison facilities may be required to have sufficient historical usage information that exceeds a defined threshold. In at least one of the various embodiments, comparison facilities may be required to have historical usage information for a defined time period, such as, the previous year, or previous two years. In addition to having historical usage information for a defined time period, RPE application 319 may be arranged to restrict eligible comparison facilities to those facilities that have had the same occupants over the entire defined historical time period.

In at least one of the various embodiments, certain regulatory regimes, such as, privacy rules may restrict access to detailed asset information and usage information of the candidate comparison facilities. In this type of situation, the treatment facility may be employed as a proxy for a comparison facility. Accordingly, in at least one of the various embodiments, RPE application 319 may be arranged to use historical usage information and historical wealth information associated with the treatment facility rather than separate comparison facility information.

In at least one of the various embodiments, to generate a proxy comparison facility, RPE application 319 may determine historical information for the treatment facility that occurs prior to the treatment facility's historical information that is used for generating its pre-treatment performance profile. For example, if historical information for year 2012 is used to generate a pre-treatment performance profile for the treatment facility, historical information for year 2011 may be used to generate a pre-treatment performance profile as a proxy for a comparison facility profile.

At block 708, in at least one of the various embodiments, candidate comparison facilities may be removed from the comparison group based on characteristics that make them unsuitable for inclusion in the provisional evaluation. In at least one of the various embodiments, facilities may be deemed unsuitable for inclusion in the provisional evaluation because historical usage information sufficient to establish a pre-"treatment" performance profile does not exist. In at least one of the various embodiments, facilities may be deemed unsuitable for inclusion in the provisional evaluation because their historical or current usage are deemed aberrant or otherwise unfit to make the facility's usage an appropriate comparison similar facilities.

At block 710, in at least one of the various embodiments, candidate comparison facilities may be removed from the comparison group because the facility has been included in the treatment group or otherwise are known to be participating in utility service reduction treatment.

At block 712, in at least one of the various embodiments, the comparison facilities may be associated with the treatment facility. In at least one of the various embodiments, RPE application 319 may be arranged to determine one or more comparison facilities for each treatment facility. In at least one of the various embodiments, RPE application 319 may be configured to select as many matching facilities as possible. Though, in some cases, a single comparison facility may be associated with a plurality of treatment facilities.

At block 714, in at least one of the various embodiments, a comparison weighting factor is determined for each comparison facility. The comparison weighting factor represents the portion of a treatment group member that a given comparison facility represents and may be used when aggregating comparison savings to appropriately weight comparison savings.

In at least one of the various embodiments, if there may be more than one comparison facility associated with a treatment facility, each the comparison savings information for each comparison facility may be divided by the total number of comparison facilities associated with the treatment facilities. For example, if a comparison facility is one of ten comparison facilities associated with a treatment facility, the comparison savings for each individual comparison facility may be divided by ten to compute its contribution to the overall comparison savings information for the treatment facility.

Next, control may be returned to a calling process.

Figure 8:
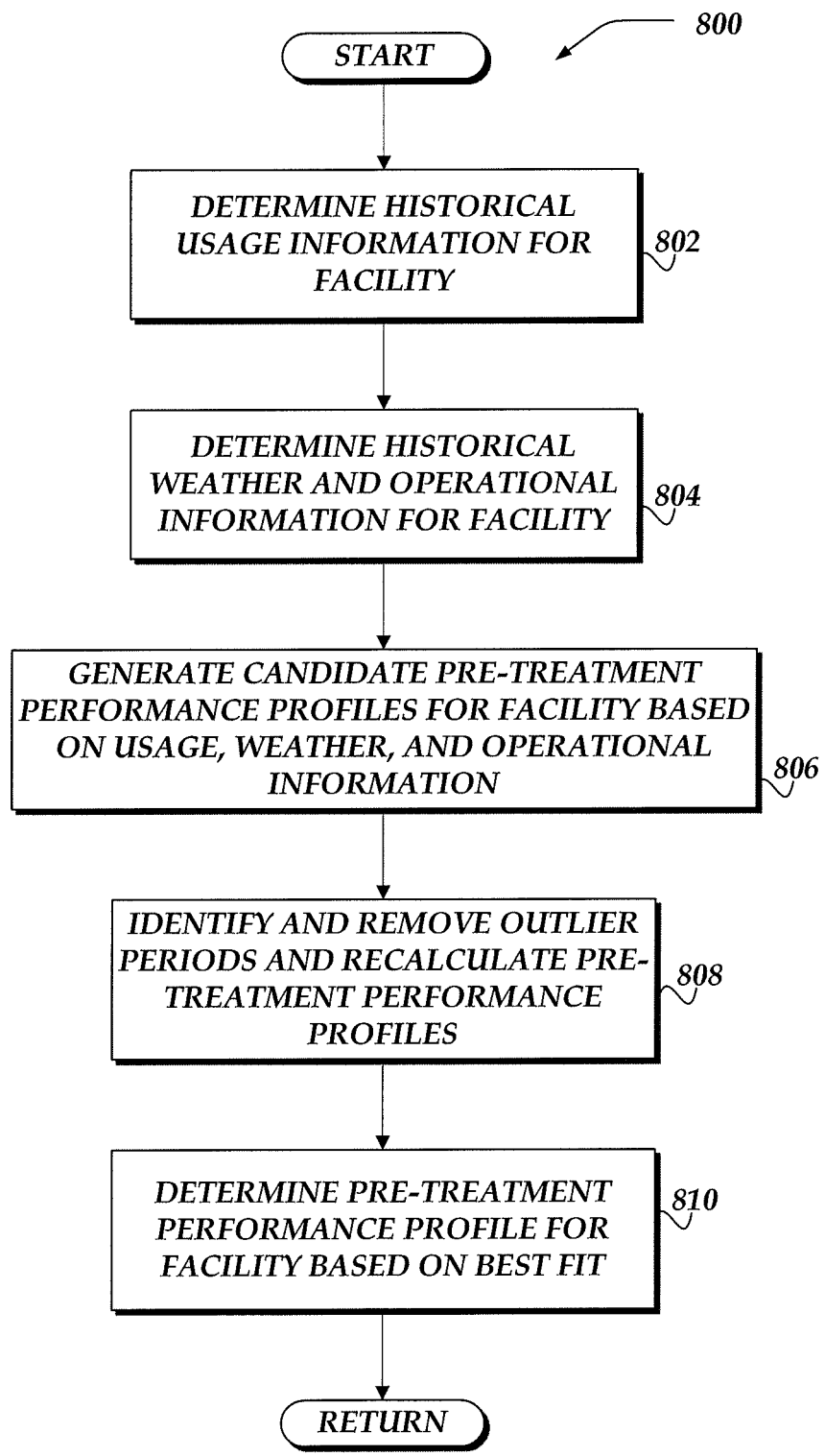
FIG. 8 shows a flowchart for a process for generating pre-treatment performance profiles in accordance with at least one of the various embodiments.

FIG. 8 shows a flowchart for process 800 for generating pre-treatment performance profiles in accordance with at least one of the various embodiments. After a start block, at block 802, in at least one of the various embodiments, the historical usage information for a facility may be determined. In at least one of the various embodiments, usage information may be determined for a defined length of time, such as, the previous year, previous quarter, previous month, or the like.

At block 804, in at least one of the various embodiments, weather information and operational information corresponding to the determined historical usage information may be determined. In at least one of the various embodiments, weather information and operational information may be determined for a defined length of time, such as, the previous year, previous quarter, previous month, or the like, corresponding to the determined historical usage information. In at least one of the various embodiments, weather information may include heating degrees days and/or cooling degree days for one or more base temperatures (e.g., balance points). In at least one of the various embodiments, operational information may include number of units of production of various types, length of time operating in different configurations, or the like.

At block 806, in at least one of the various embodiments, one or more candidate pre-treatment performance profiles for the facility may be determined based on the historical usage information and the historical weather information. In at least one of the various embodiments, pre-performance profiles may be determined for modeling the pre-treatment response to weather conditions seen by a facility.

In at least one of the various embodiments, weather information may include temperature data for the facility's locale. The historical weather information may be for a recent previous time period, such as, the previous year, previous two years, last six-months or the like. The historical weather information may be determined from weather information local and/or relevant to the facility that may be modeled using the performance profile.

In at least one of the various embodiments, if more than one set of qualifying historical weather information is available, configuration settings, or user input may be employed to determine which historical weather information to use. For example, if a facility is located in a city, there may be historical weather information for the city, county, state, or multi-state region where the facility is located. Thus, RPE application 319 may be configured to use one of a plurality of different set of historical weather data. Considerations for choosing a particular set of historical weather information may include the accuracy and precision of particular historical weather information set, cost/availability, consistency across different geographical regions, or the like.

In at least one of the various embodiments, historical usage information may include information from a previous time period that coincides with the determined historical weather information. The combination of the historical usage information and the corresponding historical weather information may be employed in combination to determine a pre-treatment performance profile for modeling the responsiveness of facility to changes in weather.

In at least one of the various embodiments, a pre-treatment performance profile may be generated based on with the following formula:

$$\text{Energy Usage} = \text{HDD}_{TempA} * \text{Coef}_{HDD} + \text{CDD}_{TempB} * \text{Coef}_{CDD} + \text{Baseload}$$

$\text{HDD}_{TempA}$ is the number of heating degree days for base temperature A over a given time period.

$\text{Coef}_{HDD}$ is a coefficient representing the responsiveness to cool weather for a facility.

$\text{CDD}_{TempB}$ is number cooling degree days for base temperature B over a given time period.

CoefCDD is a coefficient representing the responsiveness to hot/warm weather for a facility.

Baseload represents a baseline of energy usage for the facility regardless of weather conditions over a given time period.

In at least one of the various embodiments, candidate pre-treatment performance profiles may be generated at various base temperature values for HDD and CDD, with various coefficient values, and with various baseload values, or the like, to create a variety of per-treatment performance models.

In at least one of the various embodiments, commercial facilities, such as, factories, retails stores, or the like, may provide other information that RPE application 319 may employ to correct treatment saving information to improve the accuracy of its representation of the savings attributed to the facility receiving a project treatment.

In at least one of the various embodiments, RPE application 319 may be arranged to factor in variations in factory production rates as part of determining treatment savings. In at least one of the various embodiments, factory facilities may provide other information that may be sufficient to generate a metric such as, unit-of-production/kilowatt-hour. Thus, RPE application 319 may be able to determine the appropriate correction values to account for service demand variations that are attributable to production variations rather that the project treatments.

For example, a light-bulb factory facility may provide metrics, such as, the number of light-bulbs produced per kilowatt-hour and the number light-bulbs per day that have been produced. Thus, continuing with this example, RPE application 319 may be able to account for production variations that lead to variations in the usage demand for the facility. For example, given an observed usage increase of 1000 kWhrs over one month, increases in production quantity may contribute to the usage. If the kilowatt-hours per light-bulb is known and the number of light-bulb produced in the month is known, then the RPE application may generate an offset to apply to the metered current usage information to produce an accurate representation of the treatment savings.

In at least one of the various embodiments, operational information may include production or operational usage data for various types of production or operation which correlate with greater usage of utility services. The historical operational information may be for a recent previous time period, such as, the previous year, previous two years, last six-months or the like. The historical operational information may be determined from operational information or production data relevant to the facility that may be modeled using the performance profile. Operational information may be represented as the number of units of production of each of various types that correlate with greater usage of utility services as well as the number of operational activities (work shifts, hours of operation, service events) that correlate with greater usage of utility services. These units can be expressed as some number where $X_j$ represents the number of units of production of the jth type, or operational activities of the jth type, or some combination of units of production and operational activities.

In at least one of the various embodiments, a pre-treatment performance profile may be generated based on with the following formula which accounts for operational data:

$$\text{Energy Usage} = \Sigma X_j (\text{HDD}_{TempA,j} * \text{Coef}_{HDD,j} + \text{CDD}_{TempB,j} * \text{Coef}_{CDD,j} + \text{Baseload}_j) \text{ for all } j.$$

$\text{Baseload}_j$ represents the utility service usage that results from operations of the jth type regardless of the weather at a facility.

$\text{Coef}_{HDD,j}$ is a coefficient representing the additional utility service associated with operations of the jth type during conditions at a facility that require heating.

$\text{HDD}_{TempA,i}$ is the number of heating degree days over a given period at the base temperature A that is the base temperature associated with the jth type of production or operation.

$\text{Coef}_{CCD,j}$ is a coefficient representing the dependence of the energy associated with operations of the jth type to hot/warm weather for a facility.

$\text{CDD}_{TempB,j}$ is the number of cooling degree days over a given period at the base temperature B that is the base temperature associated with the jth type of production or operation.

In at least one of the various embodiments, candidate pre-treatment performance profiles may be generated at various base combinations of the base temperature values for temp A, temp B, and i. Based on these different base temperatures, various values of the HDD, CDD, coefficient values, and baseload values may be calculated to create a variety of per-treatment performance models.

At block 808, in at least one of the various embodiments, one or more outlier periods may be identified in the pre-treatment period, excluded from the pre-treatment data and the pre-treatment profile may be re-calculated based on the updated subset of pre-treatment data. In at least one of the various embodiments, outlier periods in the pre-treatment period may be identified based on their influence over the overall model of the pre-treatment response to weather and operational conditions at a facility. In at least one of the various embodiments, the model may be recalculated without outlier periods by excluding all data associated with the outlier period or periods in the pre-treatment period and generating candidate pre-treatment performance profiles based on the limited data set.

At block 810, in at least one of the various embodiments, the optimal pre-treatment performance profile for the facility may be determined based on a best fit method. In at least one of the various embodiments, one or more curve fitting methods, such as linear regression may be employed to determine the pre-treatment performance profile that fits the historical performance of the facility. The historical weather information may provide the HDDbasetemp/CDDbasetemp, the historical operational data may provide the $X_j$, and the historical usage information may provide the Energy Usage value. Well-known methods such as multi-variable linear regression may be applied with the HDD and CDD values as the two independent variables and Energy Usage as the dependent variable. In at least one of the various embodiments, RPE application 319 may be arranged to employ linear regression to determine the relationship between services consumed and weather seen (degree days) and determine the goodness of fit using least squares regression. This determined relationship enables service consumption to be modeled in the future.

In at least one of the various embodiments, the inputs for the linear regression curve fitting may be the number of heating degree days at a given temperature in a time period, the number of cooling degree days at a given temperature in the same time period and the facilities service usage in the time period.

In at least one of the various embodiments, the HDD, CDD, and Energy Usage may be divided by the number of days in the time period to get per-day figures. This may normalize data because the time period may be different ranges at different times (e.g., the number of days in a month is not constant).

In at least one of the various embodiments, the Slope, Intercept, and $R^2$ (least squares) may be determined for a range of temperature combinations of base temperature/balance points. For a given base temperature, there may be a different number of heating degree days and cooling degree days. The base temperature combinations that sufficiently conform to the known heating and cooling characteristics (e.g. historical usage and weather information) of the facility may be determined.

In at least one of the various embodiments, additional modeling/curve fitting techniques may be employed. For example, least square regression may be supplemented with Bayesian priors to adjust the fit for a priori knowledge of the likely base temperatures for heating, cooling, or for the reliance of various facility operations on the temperature. In at least one of the various embodiments, other well-known techniques, such as, Bayesian multivariate linear regression may be used for modeling/curve fitting. Also, in at least one of the various embodiments, configuration settings, or other rules, may be in place to filter and/or establish floors and/or ceilings for the base temperatures based on a priori knowledge of the weather conditions relevant to the facility. In at least one of the various embodiments, RPE application 319 may be arranged to limit candidate base temperature values to reasonable ranges that may be consistent with actual weather seen by the facility.

In at least one of the various embodiments, if least squares regression may be employed, one or more pre-treatment performance profiles may have the same least squares error/deviation value, however if one pre-treatment performance profile includes a base temperature inconsistent with actual the weather seen for a facility, it may be excluded from consideration. For example, if a candidate pre-treatment performance profile for a facility in Phoenix, Ariz. (i.e., a very hot place in the Summer) include HDD values for base temp of 45 degrees Fahrenheit, it may be a candidate for exclusion because even if linear regression determines a curve that may appear to fit at base temperature 45 degrees Fahrenheit, a base temperature of 45 degree Fahrenheit is inconsistent with the actual weather seen in Phoenix, Ariz.

In at least one of the various embodiments, RPE application 319 may be arranged to determine the best fitting pre-treatment performance profile and associate it with the corresponding facility. In at least one of the various embodiments, a pre-treatment performance profile may be generated for each treatment facility; likewise, a pre-treatment performance profile may be generated for each comparison facility. Next, control may be returned to a calling process.

Figure 9:
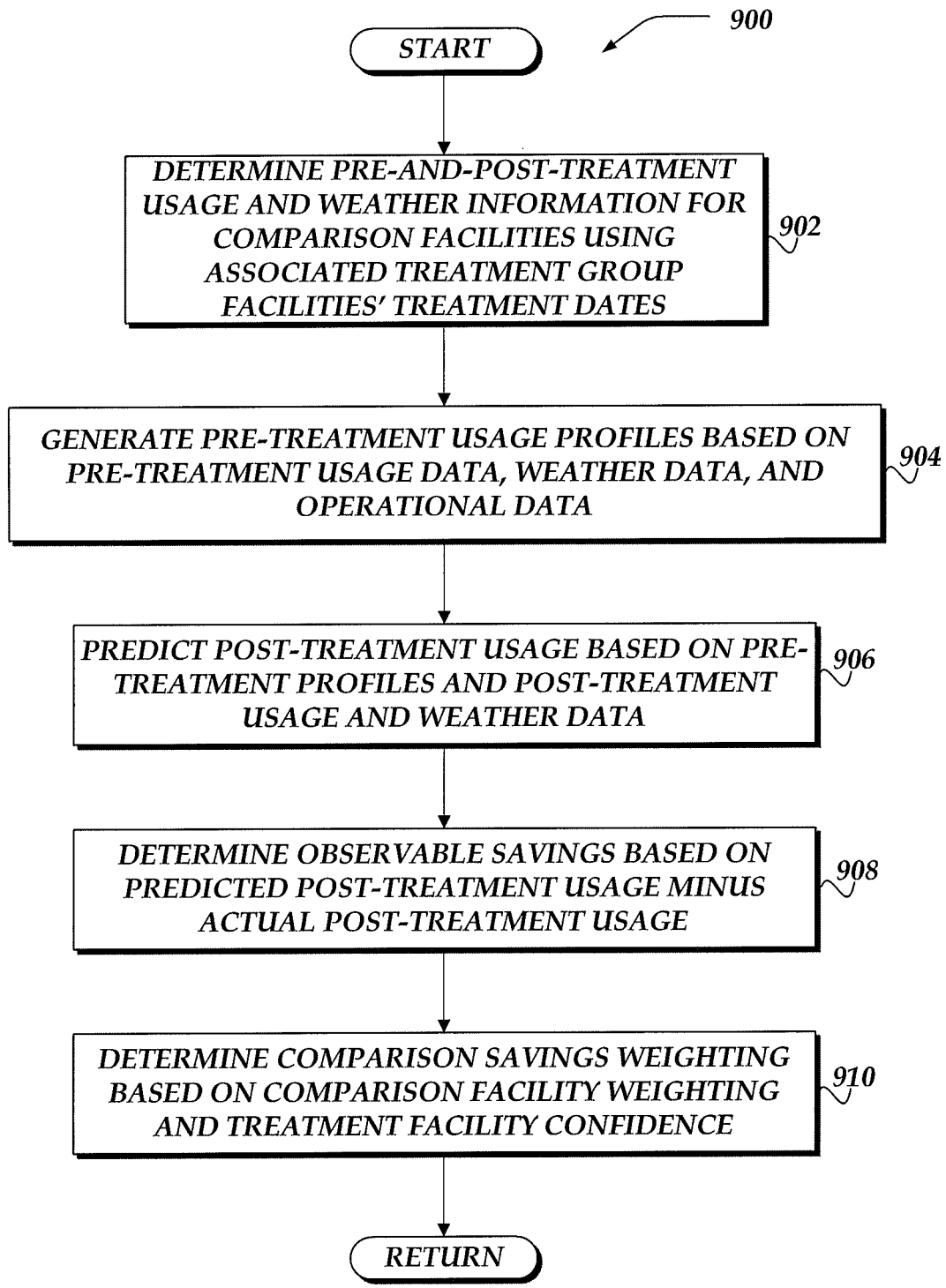
FIG. 9 shows a flowchart for a process for generating comparison savings in accordance with at least one of the various embodiments.

FIG. 9 shows a flowchart for process 900 for generating comparison savings in accordance with at least one of the various embodiments. After a start block, at block 902, in at least one of the various embodiments, the usage and weather information can be split into pre- and post-treatment based on the treatment date of the associated treatment facility. This information may be determined similarly as the current usage and weather information is determined for the treatment facility.

At block 904, in at least one of the various embodiments, the comparison facility's pre-treatment performance profile may be generated based on the pre-treatment usage information, pre-treatment weather information, and pre-treatment operational information. In at least one of the various embodiments, determining pre-treatment performance profile for the comparison facility may be determined similarly as described in FIG. 8. However, the historical information for the comparison facility is used rather than the historical information for the treatment facility.

At block 906, in at least one of the various embodiments, a prediction of the post-treatment usage for the facility may be generated based on pre-treatment usage information and post-treatment weather and operational information. In at least one of the various embodiments, the prediction of the post-treatment usage for the facility may be generated similarly as the prediction of post-treatment usage for a treatment facility. (See, block 651 in FIG. 6).

At block 908, in at least one of the various embodiments, comparison savings in the post-treatment period for the comparison facility may be generated based on the prediction of the post-treatment usage and the actual post-treatment usage. In at least one of the various embodiments, the comparison savings for the comparison facility may be generated similarly as the observable savings for a treatment facility. (See, block 652 in FIG. 6).

At block 910, in at least one of the various embodiments, the comparison savings weighting is determined based on the comparison facility weighting and the treatment facility's confidence. Next, in at least one of the various embodiments, control may be returned to a calling process.

Figure 10:
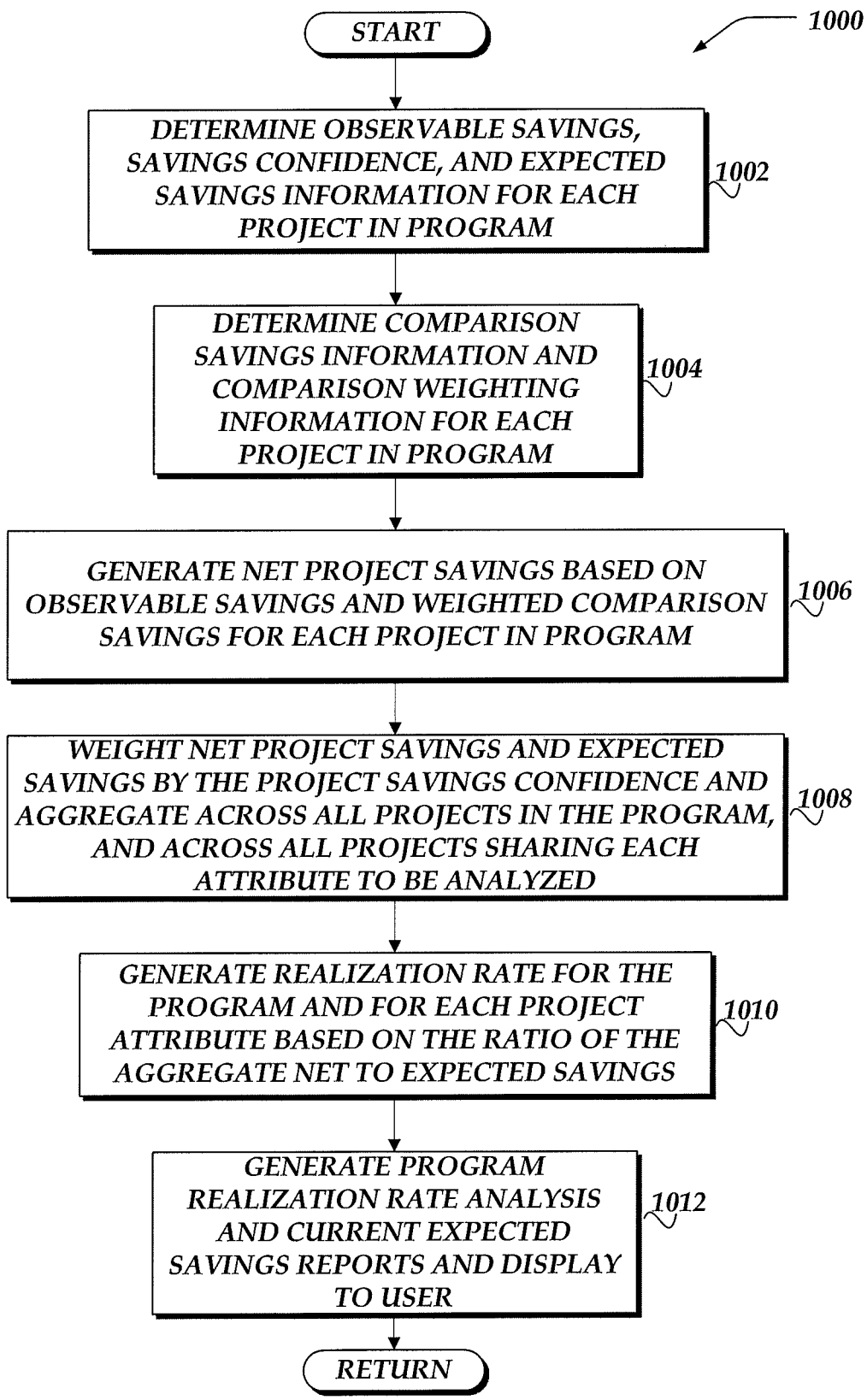
FIG. 10 shows a flowchart for a process for generating program performance reports in accordance with at least one of the various embodiments.

FIG. 10 shows a flowchart for process 1000 for generating program realization rate analysis in accordance with at least one of the various embodiments. After a start block, at block 1002, in at least one of the various embodiments, observable savings information, savings confidence information, and expected savings information may be determined for each project in the program. In at least one of the various embodiments, the observable savings information for each project for each treatment facility may be determined. In at least one of the various embodiments, the savings confidence information for each project for each treatment facility may be determined. In at least one of the various embodiments, the expected savings information for each project for each treatment facility may be determined. In at least one of the various embodiments, the observable savings information, savings confidence information and expected savings information may be retrieved from storage, or it may be generated, depending on how RPE application 319 may be configured and/or based on user input.

At block 1004, in at least one of the various embodiments, comparison savings information and comparison weighting for all comparison facilities related to each project in the program may be determined. In at least one of the various embodiments, the comparison savings for all comparison facilities associated with each project may be determined. In at least one of the various embodiments, the comparison weighting for all comparison facilities associated with each project may be determined. In at least one of the various embodiments, the comparison savings information and the comparison weighting information may be retrieved from storage, or it may be generated, depending on how RPE application 319 may be configured and/or based on user input.

At block 1006, in at least one of the various embodiments, net project savings information may be generated based on the observable savings, the comparison savings information, and the comparison weighting for each project in the program. In at least one of the various embodiments, for each project, net project savings information may be generated. In at least one of the various embodiments, the net project savings may be combination of the observable savings for a treatment facility and the comparison saving generated from corresponding comparison group facilities, weighted by the comparison savings for each corresponding facility's comparison weighting. For example, if project savings was 10 kWh and comparison savings was 2 kWh, treatment savings may be 8 kWhrs, reflecting that the project should not get credit for savings associated with the comparison group.

At block 1008, in at least one of the various embodiments, net project savings information and expected savings information may be weighted and aggregated across the entire set of projects in the program and across each attribute of projects which are to be analyzed for inclusion in an analysis of influence on project realization rate, based on the savings confidence information. In at least one of the various embodiments, the net project savings and the expected savings information for each project in the program may be weighted by the savings confidence prior to aggregation. In at least one of the various embodiments, the weighted net project savings and the weighted expected savings will be aggregated across all projects. In at least one of the various embodiments, the weighted net project savings and the weighted expected savings will be aggregated across all projects sharing a variety of attributes to be analyzed for its impact on the realization rate. For example, the weighted net project savings and the weighted expected savings may be aggregated across all projects that include a particular type of treatment or all projects that were performed by a given partner in order to assess the impact of that treatment or that partner on the realization rate of projects with which they're associated. In at least one of the various embodiments, the attributes included in a realization rate analysis may include, but are not limited to, the party performing the treatment, the party analyzing the facility for treatment, the software used to analyze the facility for treatment, the treatment performed on the facility, the location of the facility, the date when the treatment was performed, physical aspects of the facility's building(s), aspects of the facility's occupancy, aspects of the facility's operation, the facility's type, or the like.

At block 1010, in at least one of the various embodiments, realization rate information for the program and for various project attributes may be generated based on dividing the aggregated project observable savings by the weighted expected savings information.

Also, in at least one of the various embodiments, RPE application 319 may be arranged to exclude project savings information that appears to be statistical outliers. In at least one of the various embodiments, the threshold for determining if a project should be excluded as an outlier may be configured based on project type. For example, if a project type, such as, window replacement, is known to produce widely varying results, the outlier threshold may be set accordingly. Also, in at least one of the various embodiments, rather than totally excluding outliers from the program savings information, their contribution may be weighted such that they contribute less to the overall total program savings.

In at least one of the various embodiments, RPE application 319 may be arranged to modify the savings confidence of each project based on one or more confidence factors. In at least one of the various embodiments, if curve fit of a facility's pre-treatment performance profile to the historical information includes significant outlier periods, the savings confidence for that project may be reduced. In an embodiment where the confidence is adjusted for factors beyond the portion of a typical year that have currently been observed, note that the observable savings may also be adjusted by the ratio of the savings confidence taking into account all adjustments to the savings confidence based solely on portion of the weather and operational load observed to the savings. Failing to do so will leave the observable savings and hence net project savings where they are while adjusting the weighting of the expected savings associated with the projects with outlier periods and skew the realization rate calculations. As discussed above, reduced confidence in project savings information (combined with the adjustment to the net project savings) may result in reduced contribution of that project to the aggregated net savings and the aggregated weighted expected savings for the overall program or attribute. For example, assuming that a least squares regression approach for determining pre-treatment performance profiles was used, it may be likely that profiles known to be accurate will have higher R-squared values of, such as, 0.97, or above. Thus, if the R-squared value for a profile is significantly less, such as, 0.67, the profile may be determined to be inaccurate. Accordingly, in at least one of the various embodiments, RPE application 319 may be configured to map particular ranges R-squared values to particular confidence weight values. For example, an RPE application may be configured to map ranges R-squared values of 0.999-0.990 to confidence weight 1.0, 0.998-0.992 to confidence weight 0.9, 0.991-0.800 to confidence weight 0.7, and so on. Thus, in at least one of the various embodiments, project savings values may be reduced by multiplying it by a determined confidence weight value.

For example, in at least one of the various embodiments, assume project savings information for a treatment facility includes an energy savings of 10 kWhrs. Low confidence in the savings values may be reflected by multiplying the raw project savings value by a confidence coefficient of 0.25, or the like, to reflect the uncertainly in the project savings value. In at least one of the various embodiments, reducing the impact of low confidence facilities and/or project savings results may help avoid overestimating the positive impact of the project when evaluating the program as a whole.

Further, in at least one of the various embodiments, project savings information may be weighted based on the proportion of heating and cooling days seen by the treatment facility. For example, if a typical weather year includes 100 CDDs (for a given base temperature) but data was collected for only 80 CDDs the project savings may be reduced by 20% (100*80/100) to reflect that only a portion of a typical weather year was seen by the facility. Project savings may be modified similarly based on the number of HDDs seen compared the HDD's in a typical year.

Also, in at least one of the various embodiments, the collection of usable data for some projects may depend significantly on the time of year. For example, projects to improve air-conditioning efficiency (cooling energy efficiency) installed in the winter months may not generate usable data until for the RPE application until the end of summer. Thus, in at least one of the various embodiments, such projects may be excluded from RPE calculations and evaluation reports until sufficient data has been collected. In at least one of the various embodiments, RPE application 319 may be arranged to include table, or ther data structure of information for classifying a threshold number of CDD/HDDs for treatments and/or projects that enables them to be included in RPE reports.

In at least one of the various embodiments, project savings may be further modified to account for service efficiency improvements that may occur in the service population independent from the program and/or projects. Otherwise, the utility may incorrectly attribute savings to the program. For example, if the price of heating oil fuel spikes coincidentally during a heating efficiency program to convert residential oil furnaces to efficient natural gas furnaces, there may be significant rush to covert to natural gas furnaces independent of the program. Thus, RPE application 319 may be arranged to discount project savings based on a observed demand reduction and/or service savings in facilities that were included in the program. The discount may be appropriate because it can be inferred that a certain number of the treatment facilities that completed the project under the program would have made the efficient improvements absent the program. Accordingly, RPE application 319 may be arranged to include a configurable schedule of weighting factors to account for this "free-rider" effect. For example, if 10% of non-participating facility exhibited demand reduction during the program period, project savings may be proportionally reduced. The schedule of weighting factors may be adjusted based on the results of program evaluations. Also, the schedule weighting factors may be set to different values for different types of project and programs, as well as different type of external events, such, fuel prices increases, natural disasters, unseasonable weather, or the like.

In at least one of the various embodiments, RPE application 319 may be arranged to exclude project savings for facilities have use that may be inconsistent with the purpose and/or goals of the program. In at least one of the various embodiments, current and/or historical usage information may be employed to determine if a facility should be excluded from the program savings computations. For example, a cooling efficiency program maybe targeted to generate energy savings during the summer months. However, if RPE application 319 determines that the facility is rarely occupied in the summer months (e.g., Winter vacation homes in Florida), the facility may be excluded from the program savings.

Accordingly, in at least one of the various embodiments, RPE application 319 may determine one or more treatment facilities that have non-conforming usage patterns and exclude them from the program savings computation. One or more defined threshold values may be employed to score if a usage pattern is non-conforming. These threshold values may vary depending on the type of projects, programs, or the like.

In at least one of the various embodiments, a program realization rate may be generated based on a comparison of the predicted program savings and the actual program savings value. In at least one of the various embodiments, the project savings information for each project in the program may be weighted and aggregated to generate program savings information. Actual program savings values may be compared with the predicted/expected program savings values that were generated before the program went into effect to produce a realization rate for the program. For example, if a predicted program savings value is 5 MWh and the generated program savings value is 4 MWh, the generated realization rate may be 4/5=80%.

At block 1012, in at least one of the various embodiments, a program evaluation report may be generated based on the program realization information and displayed to a user and/or stored for future use. In at least one of the various embodiments, the program evaluation report may include program realization values, program savings, project savings, realization rate analysis, current expected savings, or the like.

In at least one of the various embodiments, RPE application 319 may be arranged to separate the low confidence results from the high confidence results. Accordingly, RPE application 319 may be arranged to use the high confidence results to generate a high confidence program evaluation report and the low confidence results may be used to generate a low confidence program evaluation report.

In at least one of the various embodiments, the program evaluation report may be automatically updated based on at least new current usage information and new current weather information that be periodically and/or continuously provided to RPE application 319. Further, in at least one of the various embodiments, the automatic updates to the program evaluation report may include an accounting based on a quantity of current usage information available for each treatment facility. Thus, the project savings attributable to a treatment facility may be adjusted based on the amount of information (e.g., usage information, weather information, or the like) available at the time the program evaluation report is regenerated and/or updated. Next, control may be returned to a calling process.

However, the comparison savings values may indicate that one or more factors separate from the project treatment may be contributing to the treatment savings of its corresponding treatment facility. For example, if the treatment savings for a treatment facility is 8% and the comparison savings for its associated comparison facilities is 5%, it may indicate that the project treatment contributed 3% to the overall usage savings while other factors contributed 5% to the overall usage savings.

It will be understood that each block of the flowchart illustration, and combinations of blocks in the flowchart illustration, can be implemented by computer program instructions. These program instructions may be provided to a processor to produce a machine, such that the instructions, which execute on the processor, create means for implementing the actions specified in the flowchart block or blocks. The computer program instructions may be executed by a processor to cause a series of operational steps to be performed by the processor to produce a computer-implemented process such that the instructions, which execute on the processor to provide steps for implementing the actions specified in the flowchart block or blocks. The computer program instructions may also cause at least some of the operational steps shown in the blocks of the flowchart to be performed in parallel. Moreover, some of the steps may also be performed across more than one processor, such as might arise in a multi-processor computer system. In addition, one or more blocks or combinations of blocks in the flowchart illustration may also be performed concurrently with other blocks or combinations of blocks, or even in a different sequence than illustrated without departing from the scope or spirit of the invention.

Accordingly, blocks of the flowchart illustration support combinations of means for performing the specified actions, combinations of steps for performing the specified actions and program instruction means for performing the specified actions. It will also be understood that each block of the flowchart illustration, and combinations of blocks in the flowchart illustration, can be implemented by special purpose hardware-based systems, which perform the specified actions or steps, or combinations of special purpose hardware and computer instructions. The foregoing example should not be construed as limiting and/or exhaustive, but rather, an illustrative use case to show an implementation of at least one of the various embodiments of the invention.

What is claimed as new and desired to be protected by Letters Patent of the United States:

1. A method for provisionally evaluating performance of a program to reduce utility service demand for at least one facility using a computer that includes a hardware processor that executes software code to perform actions, comprising:
    determining historical weather information for a location of the at least one facility based on signals provided by a global positioning system (GPS) sensor;
    generating prediction of post-treatment usage and the confidence information based on weather data;
    employing a real time provisioning evaluation application to perform actions, including:
        determining a plurality of treatment facilities and each project to be included for evaluation based on at least a portion of treatment project data and treatment facility usage data;
        determining utility service demand information for each determined treatment facility and each determined project;
        identifying each project and each treatment facility to be included in a provisional evaluation based on the at least portion of treatment project data stored in a software database;
        identifying at least of portion of usage data that is associated with each identified project and each identified treatment facility and dividing the usage data into pre-treatment usage data and post-treatment usage data based on at least a project treatment date that is included in the at least portion of treatment project data;
        determining a plurality of candidate comparison facilities based on a value for at least one service usage characteristic for each candidate comparison facility that is similar to another value for the same service usage characteristic for each identified treatment facility;
        determining at least one comparison facility from the plurality of candidate comparison facilities based on at least a pre-treatment profile for the at least one comparison facility that is stored in the software database;
        generating comparison savings information based on pre-treatment usage data and post-treatment usage data provided for the at least one comparison facility;
        generating a prediction of post-treatment usage for each identified treatment facility to be analyzed based on at least a portion of the pre-treatment usage data, wherein the pretreatment usage data includes the historical weather information provided for each identified treatment facility;
        generating observable savings information for each identified project based on a reduction in utility service demand for each treatment facility, wherein the project observable savings information is based on at least the prediction of post-treatment usage, the comparison savings information, and actual post-treatment usage for at least one treatment facility having at least one completed project;
        generating savings confidence information for each identified treatment facility based on at least the at least portion of treatment project data and length of the post-treatment period;
        generating a program realization rate analysis based on an aggregation of project observable savings information, the savings confidence information, and an expected savings information for each identified treatment facility treated by each identified project; and
    employing a hardware display to provide the program realization rate analysis to a user.

2. The method of claim 1, wherein generating the project realization rate analysis, further comprises:
    determining at least each identified treatment facility, each identified project, and at least a portion of project attributes based on project data for a current project, wherein the at least portion of project attributes includes at least treatment dates and expected savings; and
    automatically updating the program realization rate analysis based on at least one of new usage data or new project data for the each identified treatment facility, each identified project, and the at least a portion of project attributes, wherein the updates to the program realization rate analysis include an accounting based on a quantity of usage information currently available for each treatment facility.

3. The method of claim 1, further comprising:
    determining the at least one comparison facility based on at least one characteristic of at least one treatment facility;
    generating the at least comparison savings information based on at least a portion of the determined utility service demand information;
    generating weighted comparison savings information based on a quotient of aggregated service demand information for the at least one comparison facility and a number of the at least one comparison facilities that are associated with the at least one treatment facilities; and
    generating net project savings information for a reduction in utility service demand for each identified treatment facility relative to untreated facilities based on the comparison savings information and the weighted comparison information, wherein the comparison information includes at least a comparison of the reduced utility service demand for the identified treatment facility to the utility service demand for the at least one comparison facility.

4. The method of claim 1, wherein generating the project realization rate analysis further comprises, including all projects sharing one or more project attributes for determining the influence of a one or more shared project attributes on the project realization rate based on at least aggregated weighted expected project savings information, aggregated weighted observable, or net project savings information.

5. The method of claim 1, further comprising, generating at least program to-date estimated savings information based on at least the expected project savings information and at least one of the observable savings information for each identified project or at least net project savings information.

6. The method of claim 1, further comprising, generating prediction of post-treatment usage and the confidence information based on weather data.

7. The method of claim 1, further comprising:
identifying a portion of operational data associated with each identified treatment facility;
dividing the identified operational data into pre-treatment operational data and post-treatment operational data based on the project treatment date in the at least portion of treatment project data;
generating the prediction of post-treatment usage based on at least in part on operational data; and
generating the confidence information based on at least in part on operational data.

8. The method of claim 1, further comprising, generating an annualized savings report based on at least the aggregation of project observable savings information, wherein the annualized savings report is made available to at least one of owners, occupants, or managers, of the at least one facility.

9. A system for provisionally evaluating performance of a program to reduce utility service demand for at least one facility, comprising:
a network computer, including:
a transceiver for communicating over the network;
a memory for storing at least instructions;
a processor device that executes software instructions for a real time provisioning evaluation application that performs actions, including:
determining historical weather information for a location of the at least one facility based on signals provided by a global positioning system (GPS) sensor;
determining a plurality of treatment facilities and each project to be included for evaluation based on at least a portion of treatment project data and treatment facility usage data;
determining utility service demand information for each determined treatment facility and each determined project;
identifying each project and each treatment facility to be included in a provisional evaluation based on the at least portion of treatment project data stored in a software database;
identifying at least of portion of usage data that is associated with each identified project and each identified treatment facility and dividing the usage data into pre-treatment usage data and post-treatment usage data based on at least a project treatment date that is included in the at least portion of treatment project data;
determining a plurality of candidate comparison facilities based on a value for at least one service usage characteristic for each candidate comparison facility that is similar to another value for the same service usage characteristic for each identified treatment facility;
determining at least one comparison facility from the plurality of candidate comparison facilities based on at least a pre-treatment profile for the at least one comparison facility that is stored in the software database;
generating comparison savings information based on pre-treatment usage data and post-treatment usage data provided for the at least one comparison facility;
generating a prediction of post-treatment usage for each identified treatment facility to be analyzed based on at least a portion of the pre-treatment usage data;
generating a prediction of post-treatment usage for each identified treatment facility to be analyzed based on at least a portion of the pre-treatment usage data, wherein the pretreatment usage data includes the historical weather information determined for each identified treatment facility;
generating observable savings information for each identified project based on a reduction in utility service demand for each treatment facility, wherein the project observable savings information is based on at least the prediction of post-treatment usage, the comparison savings information, and actual post-treatment usage for at least one treatment facility having at least one completed project;
generating savings confidence information for each identified treatment facility based on at least the at least portion of treatment project data and length of the post-treatment period;
generating a program realization rate analysis based on an aggregation of project observable savings information, the savings confidence information, and an expected savings information for each identified treatment facility treated by each identified project; and
a client network computer, including:
the GPS sensor for determining the location of the at least one facility;
a transceiver for communicating over the network;
a memory for storing at least instructions;
a processor device that is operative to execute software instructions for an application that performs actions, including:
providing at least treatment project data to the network computer; and
displaying the program realization rate analysis on a hardware display.

10. The system of claim 9, wherein generating the project realization rate analysis, further comprises:
determining at least each identified treatment facility, each identified project, and at least a portion of project attributes based on project data for a current project, wherein the at least portion of project attributes includes at least treatment dates and expected savings; and
automatically updating the program realization rate analysis based on at least one of new usage data or new project data for the each identified treatment facility, each identified project, and the at least a portion of project attributes, wherein the updates to the program realization rate analysis include an accounting based on a quantity of usage information currently available for each treatment facility.

11. The system of claim 9, further comprising:
determining the at least one comparison facility based on at least one characteristic of at least one treatment facility;

generating the at least comparison savings information based on at least a portion of the determined utility service demand information;
generating weighted comparison savings information based on a quotient of aggregated service demand information for the at least one comparison facility and a number of the at least one comparison facilities that are associated with the at least one treatment facilities; and
generating net project savings information for a reduction in utility service demand for each identified treatment facility relative to untreated facilities based on the comparison savings information and the weighted comparison information, wherein the comparison information includes at least a comparison of the reduced utility service demand for the identified treatment facility to the utility service demand for the at least one comparison facility.

12. The system of claim 9, wherein generating the project realization rate analysis further comprises, including all projects sharing one or more project attributes for determining the influence of a one or more shared project attributes on the project realization rate based on at least aggregated weighted expected project savings information, aggregated weighted observable, or net project savings information.

13. The system of claim 9, further comprising, generating at least program to-date estimated savings information based on at least the expected project savings information and at least one of the observable savings information for each identified project or at least net project savings information.

14. The system of claim 9, further comprising, generating prediction of post-treatment usage and the confidence information based on weather data.

15. The system of claim 9, further comprising:
identifying a portion of operational data associated with each identified treatment facility;
dividing the identified operational data into pre-treatment operational data and post-treatment operational data based on the project treatment date in the at least portion of treatment project data;
generating the prediction of post-treatment usage based on at least in part on operational data; and
generating the confidence information based on at least in part on operational data.

16. The system of claim 9, further comprising, generating an annualized savings report based on at least the aggregation of project observable savings information, wherein the annualized savings report is made available to at least one of owners, occupants, or managers, of the at least one facility.

17. A network computer for provisionally evaluating performance of a program to reduce utility service demand for at least one facility, comprising:
a transceiver for communicating over the network;
a memory for storing at least instructions;
a processor device that executes software instructions for a real time provisioning evaluation application that performs actions, including:
determining historical weather information for a location of the at least one facility based on signals provided by a global positioning system (GPS) sensor;
determining a plurality of treatment facilities and each project to be included for evaluation based on at least a portion of treatment project data and treatment facility usage data;
determining utility service demand information for each determined treatment facility and each determined project;
identifying each project and each treatment facility to be included in a provisional evaluation based on the at least portion of treatment project data stored in a software database;
identifying at least of portion of usage data that is associated with each identified project and each identified treatment facility and dividing the usage data into pre-treatment usage data and post-treatment usage data based on at least a project treatment date that is included in the at least portion of treatment project data;
determining a plurality of candidate comparison facilities based on a value for at least one service usage characteristic for each candidate comparison facility that is similar to another value for the same service usage characteristic for each identified treatment facility;
determining at least one comparison facility from the plurality of candidate comparison facilities based on at least a pre-treatment profile for the at least one comparison facility that is stored in the software database;
generating comparison savings information based on pre-treatment usage data and post-treatment usage data provided for the at least one comparison facility;
generating a prediction of post-treatment usage for each identified treatment facility to be analyzed based on at least a portion of the pre-treatment usage data;
generating a prediction of post-treatment usage for each identified treatment facility to be analyzed based on at least a portion of the pre-treatment usage data; wherein the pretreatment usage data includes the historical weather information determined for each identified treatment facility;
generating observable savings information for each identified project based on a reduction in utility service demand for each treatment facility, wherein the project observable savings information is based on at least the prediction of post-treatment usage, the comparison savings information, and actual post-treatment usage for at least one treatment facility having at least one completed project;
generating savings confidence information for each identified treatment facility based on at least the at least portion of treatment project data and length of the post-treatment period;
generating a program realization rate analysis based on an aggregation of project observable savings information, the savings confidence information, and
an expected savings information for each identified treatment facility treated by each identified project; and
employing a hardware display to provide the program realization rate analysis to a user.

18. The network computer of claim 17, wherein generating the project realization rate analysis, further comprises:
determining at least each identified treatment facility, each identified project, and at least a portion of project attributes based on project data for a current project, wherein the at least portion of project attributes includes at least treatment dates and expected savings; and
automatically updating the program realization rate analysis based on at least one of new usage data or new project data for the each identified treatment facility, each identified project, and the at least a portion of project attributes, wherein the updates to the program realization rate analysis include an accounting based on a quantity of usage information currently available for each treatment facility.

19. The network computer of claim 17, further comprising:
determining the at least one comparison facility based on at least one characteristic of at least one treatment facility;
generating the at least comparison savings information based on at least a portion of the determined utility service demand information;
generating weighted comparison savings information based on a quotient of aggregated service demand information for the at least one comparison facility and a number of the at least one comparison facilities that are associated with the at least one treatment facilities; and
generating net project savings information for a reduction in utility service demand for each identified treatment facility relative to untreated facilities based on the comparison savings information and the weighted comparison information, wherein the comparison information includes at least a comparison of the reduced utility service demand for the identified treatment facility to the utility service demand for the at least one comparison facility.

20. The network computer of claim 17, wherein generating the project realization rate analysis further comprises, including all projects sharing one or more project attributes for determining the influence of a one or more shared project attributes on the project realization rate based on at least aggregated weighted expected project savings information, aggregated weighted observable, or net project savings information.

21. The network computer of claim 17, further comprising, generating at least program to-date estimated savings information based on at least the expected project savings information and at least one of the observable savings information for each identified project or at least net project savings information.

22. The network computer of claim 17, further comprising, generating prediction of post-treatment usage and the confidence information based on weather data.

23. The network computer of claim 17, further comprising:
identifying a portion of operational data associated with each identified treatment facility;
dividing the identified operational data into pre-treatment operational data and post-treatment operational data based on the project treatment date in the at least portion of treatment project data;
generating the prediction of post-treatment usage based on at least in part on operational data; and
generating the confidence information based on at least in part on operational data.

24. A processor readable non-transitory storage media that includes software instructions for provisionally evaluating performance of a program to reduce utility service demand for at least one facility, wherein a network computer that includes a hardware processor executes at least a portion of the software instructions to perform actions, comprising:
determining historical weather information for a location of the at least one facility based on signals provided by a global positioning system (GPS) sensor;
employing a real time provisioning evaluation application to perform actions, including:
determining a plurality of treatment facilities and each project to be included for evaluation based on at least a portion of treatment project data and treatment facility usage data;
determining utility service demand information for each determined treatment facility and each determined project;
identifying each project and each treatment facility to be included in a provisional evaluation based on the at least portion of treatment project data stored in a software database;
identifying at least of portion of usage data that is associated with each identified project and each identified treatment facility and dividing the usage data into pre-treatment usage data and post-treatment usage data based on at least a project treatment date that is included in the at least portion of treatment project data;
determining a plurality of candidate comparison facilities based on a value for at least one service usage characteristic for each candidate comparison facility that is similar to another value for the same service usage characteristic for each identified treatment facility;
determining at least one comparison facility from the plurality of candidate comparison facilities based on at least a pre-treatment profile for the at least one comparison facility that is stored in the software database;
generating comparison savings information based on pre-treatment usage data and post-treatment usage data provided for the at least one comparison facility;
generating a prediction of post-treatment usage for each identified treatment facility to be analyzed based on at least a portion of the pre-treatment usage data;
generating a prediction of post-treatment usage for each identified treatment facility to be analyzed based on at least a portion of the pre-treatment usage data, wherein the pretreatment usage data includes the historical weather information determined for each identified treatment facility;
generating observable savings information for each identified project based on a reduction in utility service demand for each treatment facility, wherein the project observable savings information is based on at least the prediction of post-treatment usage, the comparison savings information, and actual post-treatment usage for at least one treatment facility having at least one completed project;
generating savings confidence information for each identified treatment facility based on at least the at least portion of treatment project data and length of the post-treatment period;
generating a program realization rate analysis based on an aggregation of project observable savings information, the savings confidence information, and an expected savings information for each identified treatment facility treated by each identified project; and
employing a hardware display to provide the program realization rate analysis to a user.

25. The media of claim 24, wherein generating the project realization rate analysis, further comprises:
determining at least each identified treatment facility, each identified project, and at least a portion of project attributes based on project data for a current project, wherein the at least portion of project attributes includes at least treatment dates and expected savings; and automatically updating the program realization rate analysis based on at least one of new usage data or new project data for the each identified treatment facility, each identified project, and the at least a portion of project attributes, wherein the updates to the program realization rate analysis include an accounting based on a quantity of usage information currently available for each treatment facility.

26. The media of claim 24, further comprising:

determining the at least one comparison facility based on at least one characteristic of at least one treatment facility;

generating the at least comparison savings information based on at least a portion of the determined utility service demand information;

generating weighted comparison savings information based on a quotient of aggregated service demand information for the at least one comparison facility and a number of the at least one comparison facilities that are associated with the at least one treatment facilities; and generating net project savings information for a reduction in utility service demand for each identified treatment facility relative to untreated facilities based on the comparison savings information and the weighted comparison information, wherein the comparison information includes at least a comparison of the reduced utility service demand for the identified treatment facility to the utility service demand for the at least one comparison facility.

27. The media of claim 24, wherein generating the project realization rate analysis further comprises, including all projects sharing one or more project attributes for determining the influence of a one or more shared project attributes on the project realization rate based on at least aggregated weighted expected project savings information, aggregated weighted observable, or net project savings information.

28. The media of claim 24, further comprising, generating at least program to-date estimated savings information based on at least the expected project savings information and at least one of the observable savings information for each identified project or at least net project savings information.

29. The media of claim 24, further comprising, generating prediction of post-treatment usage and the confidence information based on weather data.

30. The media of claim 24, further comprising:

identifying a portion of operational data associated with each identified treatment facility;

dividing the identified operational data into pre-treatment operational data and post-treatment operational data based on the project treatment date in the at least portion of treatment project data;

generating the prediction of post-treatment usage based on at least in part on operational data; and generating the confidence information based on at least in part on operational data.

* * * * *